(12) United States Patent
Oshima et al.

(10) Patent No.: US 11,635,520 B2
(45) Date of Patent: Apr. 25, 2023

(54) MEASURING DEVICE AND MEASURING METHOD

(71) Applicant: NIPPON STEEL CORPORATION, Tokyo (JP)

(72) Inventors: Shinichi Oshima, Tokyo (JP); Yoshito Isei, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/423,652

(22) PCT Filed: Jan. 23, 2020

(86) PCT No.: PCT/JP2020/002420
§ 371 (c)(1),
(2) Date: Jul. 16, 2021

(87) PCT Pub. No.: WO2020/153453
PCT Pub. Date: Jul. 30, 2020

(65) Prior Publication Data
US 2022/0043150 A1    Feb. 10, 2022

(30) Foreign Application Priority Data

Jan. 23, 2019 (JP) .............................. JP2019-009532
Apr. 3, 2019 (JP) .............................. JP2019-071081

(51) Int. Cl.
*G01S 17/58* (2006.01)
*G01S 7/48* (2006.01)
(Continued)

(52) U.S. Cl.
CPC .............. *G01S 17/58* (2013.01); *G01S 7/481* (2013.01); *G01S 7/4808* (2013.01); *G01S 7/497* (2013.01)

(58) Field of Classification Search
CPC ........ G01S 17/58; G01S 7/4808; G01S 7/481; G01S 7/497
See application file for complete search history.

(56) References Cited

U.S. PATENT DOCUMENTS

| 4,995,726 A | 2/1991 | Fujita et al. |
| 5,949,546 A * | 9/1999 | Lee .................. G01B 11/14 356/492 |

(Continued)

FOREIGN PATENT DOCUMENTS

| JP | 1-206283 A | 8/1989 |
| JP | 2-87005 A | 3/1990 |

(Continued)

OTHER PUBLICATIONS

English version of JP 2004233226 A.*
(Continued)

*Primary Examiner* — Yuqing Xiao
*Assistant Examiner* — Jempson Noel
(74) *Attorney, Agent, or Firm* — Birch, Stewart, Kolasch & Birch, LLP

(57) ABSTRACT

The present invention provides a measuring apparatus and a measuring method in which a relative moving velocity of a target to be measured or a separation displacement of the target to be measured can be accurately measured even in a case where the target to be measured is moved. In a measuring apparatus, a relative moving velocity of a target to be measured and a separation displacement of the target to be measured can be measured in consideration of the influence of Doppler shift that occurs due to the movement of the target to be measured in an in-plane direction, and thus, even in a case where the target to be measured is moved in the in-plane direction, the relative moving velocity
(Continued)

of the target to be measured and the separation displacement of the target to be measured can be accurately measured.

20 Claims, 17 Drawing Sheets

(51) Int. Cl.
*G01S 7/481* (2006.01)
*G01S 7/497* (2006.01)

(56) References Cited

U.S. PATENT DOCUMENTS

| | | | | |
|---|---|---|---|---|
| 7,061,592 B2* | 6/2006 | Deines | .................... | G01P 3/366 |
| | | | | 356/28 |
| 2005/0030520 A1* | 2/2005 | Wada | ...................... | G01S 17/58 |
| | | | | 356/28.5 |
| 2006/0074326 A1 | 4/2006 | Sebastian et al. | | |
| 2011/0164243 A1* | 7/2011 | Ueno | ........................ | G01P 3/50 |
| | | | | 356/498 |
| 2016/0003862 A1* | 1/2016 | Ueno | ........................ | G01P 3/36 |
| | | | | 356/28 |

FOREIGN PATENT DOCUMENTS

| | | | | |
|---|---|---|---|---|
| JP | 4-65601 | A | | 3/1992 |
| JP | 08101014 | A | * | 4/1996 |
| JP | 9-257415 | A | | 10/1997 |
| JP | 11-132752 | A | | 5/1999 |
| JP | 2001-343222 | A | | 12/2001 |
| JP | 2002-267426 | A | | 9/2002 |
| JP | 2004233226 | A | * | 8/2004 |
| JP | 2006029912 | A | * | 2/2006 |
| JP | 2006-184181 | A | | 7/2006 |
| JP | 2006-300753 | A | | 11/2006 |
| JP | 2008-513145 | A | | 5/2008 |
| JP | 2014-102258 | A | | 6/2014 |
| JP | 2016-080409 | A | | 5/2016 |
| JP | 2016080409 | A | * | 5/2016 |
| JP | 2016-176827 | A | | 10/2016 |
| JP | 2017053789 | A | * | 3/2017 |

OTHER PUBLICATIONS

English version of JP 2006029912 A.*
English version of JP 08101014 A.*
English version of JP-2016080409-A.*
English version of JP 2016080409 A (Year: 2016).*
English version of JP 2017053789 A (Year: 2017).*

* cited by examiner

MEASURING DEVICE AND MEASURING METHOD

TECHNICAL FIELD

The present invention relates to a measuring apparatus and a measuring method.

BACKGROUND ART

As a distance measuring apparatus for measuring a distance to a target to be measured with a high accuracy, a distance measuring apparatus using a frequency-shifted feedback laser (FSF laser) light source has been known for example, as described in PTL 1.

In general, in such a distance measuring apparatus using laser light of which the frequency is modulated with respect to time, frequency-modulated light exiting from a laser oscillator is split into reference light and measurement light, a target to be measured is irradiated with the measurement light, and reflection light that is returned by being reflected on the surface of the target to be measured (also referred to as a target surface to be measured) is incident on a light detection unit. On the other hand, the reference light is incident on the light detection unit through a path having a predetermined light path length. The light detection unit converts an optical signal into an electric signal. In general, the path of light which exits from the laser oscillator and then reaches the light detection unit as the reflection light by being reflected on a measurement surface of the target to be measured and the path of light which exits from the laser oscillator and then reaches the light detection unit as the reference light have different light path lengths. Accordingly, a time required for light to exit the laser oscillator and then to reach the light detection unit is also different between the reflection light and the reference light.

The frequency of light exiting from the laser oscillator is constantly changed with time at a predetermined frequency modulation velocity, on the basis of a predetermined rule that is grasped in advance by an operator (a triangular wave, a comb-line wave, a sine wave, or the like), and thus, the reflection light and the reference light that are incident on the light detection unit have different frequencies. Accordingly, in the light detection unit, a beat signal having the same frequency as a frequency difference between the reflection light and the reference light is detected by interference between the reflection light and the reference light.

The frequency of the beat signal (a beat frequency) is identical to a change amount of an oscillation frequency of the laser oscillator in a time difference between a time required for the measurement light to exit from the laser oscillator and then to reach the light detection unit as the reflection light and a time for the reference light to exit from the laser oscillator and then to reach the light detection unit. Accordingly, in such a distance measuring apparatus using laser light of which the frequency is modulated with respect to time (preferably, laser light of which the frequency is linearly modulated), a distance to the target to be measured can be measured by converting the beat frequency into a difference in the light path length.

In PTL 2, a velocity measuring apparatus (an optical fiber sensor) is disclosed in which laser light exits from an exiting end surface of an optical fiber along a surface normal direction of a target to be measured, and the velocity of the target to be measured that is moved in a direction separated from the exiting end surface or in a direction approaching the exiting end surface can be measured.

CITATION LIST

Patent Literature

PTL 1: JP-A-2016-80409
PTL 2: JP-A-9-257415

SUMMARY OF INVENTION

Technical Problem

However, it has been found that the distance measuring apparatus described in PTL 1 measures a distance to the target to be measured that remains still, and a distance to the target to be measured that is moved in the in-plane direction or a displacement is not capable of being accurately measured.

In the velocity measuring apparatus described in PTL 2, the velocity of the target to be measured that is moved in the direction separated from the exiting end surface of the optical fiber or in the direction approaching the exiting end surface can be measured, but the velocity of the target to be measured that is moved along the in-plane direction is not capable of being measured.

As a second problem, in order to measure the velocity or the distance of the target to be measured, it may be necessary to grasp an inclination angle of an optical axis of the laser light with respect to the target to be measured. For this reason, it is also desirable to accurately measure the inclination angle of the optical axis of the laser light with respect to the target to be measured.

Therefore, the invention has been made in consideration of the problem as described above, and an object thereof is to provide a measuring apparatus and a measuring method in which a relative moving velocity of a target to be measured or a displacement between the measuring apparatus and the target to be measured (a distance to the target to be measured from the measuring apparatus) can be accurately measured even in a case where the target to be measured is moved.

In addition, the invention has been made in consideration of the second problem as described above, and an object thereof is to provide a measuring method in which an inclination angle of an optical axis of laser light with respect to the target to be measured can be accurately measured.

Solution to Problem

A measuring apparatus of the invention is a measuring apparatus for measuring at least any one of a separation displacement that is a displacement of a target to be measured that is moved in a predetermined direction and a moving velocity that is a relative velocity in a direction orthogonal to the predetermined direction, the apparatus including: an optical splitter splitting laser light that is modulated with respect to time by a predetermined frequency modulation velocity into reference light and measurement light; one or two or more measuring heads including an irradiation and light receiving surface that irradiates the measurement light and receives reflection light obtained by reflection of the measurement light; a light detection unit outputting a beat signal by light interference between the reflection light and the reference light; and an arithmetic processing unit to which the beat signal is input, in which in the measuring head, an optical axis of the laser light that is irradiated from the irradiation and light receiving surface is disposed to be inclined with respect to the predetermined direction, and the arithmetic processing unit detects a beat frequency based on the beat signal, calculates a frequency difference that is a difference between the beat frequency at the time of measurement and a reference frequency that is a beat frequency in a predetermined reference state, and calculates at least any one of the moving velocity and the separation displacement, on the basis of the frequency difference and an inclination angle of the optical axis of the laser light that is disposed to be inclined.

A measuring method of the invention is a measuring method for measuring at least any one of a separation displacement that is a displacement of a target to be measured that is moved in a predetermined direction and a moving velocity that is a relative velocity in a direction orthogonal to the predetermined direction, the method including: a splitting step of splitting laser light that is modulated with respect to time by a predetermined frequency modulation velocity into reference light and measurement light; an irradiation and light receiving step of irradiating a surface of the target to be measured with the measurement light from an irradiation and light receiving surface and of receiving reflection light obtained by the measurement light that is reflected on the surface of the target to be measured with the irradiation and light receiving surface, by using one or two or more measuring heads in which an optical axis of the laser light that is irradiated from the irradiation and light receiving surface is disposed to be inclined with respect to the predetermined direction; a light detecting step of outputting a beat signal by light interference between the reflection light and the reference light; and an arithmetic processing step of performing arithmetic processing with an arithmetic processing unit by inputting the beat signal into the arithmetic processing unit, in which in the arithmetic processing step, a beat frequency based on the beat signal is detected, a frequency difference that is a difference between the beat frequency at the time of measurement and a reference frequency that is a beat frequency in a predetermined reference state is calculated, and at least any one of the moving velocity and the separation displacement is calculated on the basis of the frequency difference and an inclination angle of the optical axis of the laser light that is disposed to be inclined.

Advantageous Effects of Invention

According to the measuring apparatus and the measuring method of the invention, a relative moving velocity of a target to be measured or a separation displacement of the target to be measured can be measured in consideration of the influence of a Doppler shift that occurs due to the movement of the target to be measured, and thus, even in a case where the target to be measured is moved, the relative moving velocity of the target to be measured or the separation displacement of the target to be measured can be accurately measured.

It is also possible to provide a measuring method in which an inclination angle of an optical axis of laser light with respect to a target to be measured can be accurately measured.

DESCRIPTION OF EMBODIMENTS

The present inventors have confirmed that in a case where a distance to the surface of a plate-like target to be measured (a target surface to be measured) that is moved in an in-plane direction is measured by a general rangefinder using frequency-shifted feedback (FSF) laser, a measurement distance that is obtained from a rangefinder is changed in accordance with a moving velocity of the target to be measured. Therefore, the present inventors have conducted intensive studies about the cause of such a change in the measurement distance.

As a result thereof, the present inventors have found that the reason that the measurement distance is apparently shifted at the time of measuring a distance to the target to be measured that is moved by using a laser oscillator measurement is because the laser light is affected by a Doppler shift. More specifically, the present inventors have assumed that an optical axis of the FSF laser is inclined with respect to the target surface to be measured, and thus, is affected by a Doppler shift, as the cause of a shift in the measurement distance.

On the basis of such assumption, the present inventors have conducted consideration with respect to a method for excluding a shift in a measurement value that apparently occurs and for measuring a displacement from a reference position of a target to be measured that is moved in a predetermined direction (hereinafter, herein, simply referred to as a "separation displacement") and a moving velocity in a direction orthogonal to the predetermined direction (hereinafter, herein, referred to as a "moving velocity") with a high accuracy. As a result thereof, the present inventors have conceived a measuring apparatus and a measuring method according to this embodiment as described below. Hereinafter, the measuring apparatus and the measuring method according to this embodiment will be sequentially described. Note that, the moving velocity in the direction orthogonal to the predetermined direction may indicate a velocity component of the velocity in the direction orthogonal to the predetermined direction in the case of being moved in an arbitrary direction.

(1) <First Embodiment>

(1-1) <Outline of Measuring Apparatus According to First Embodiment>

Figure 1:
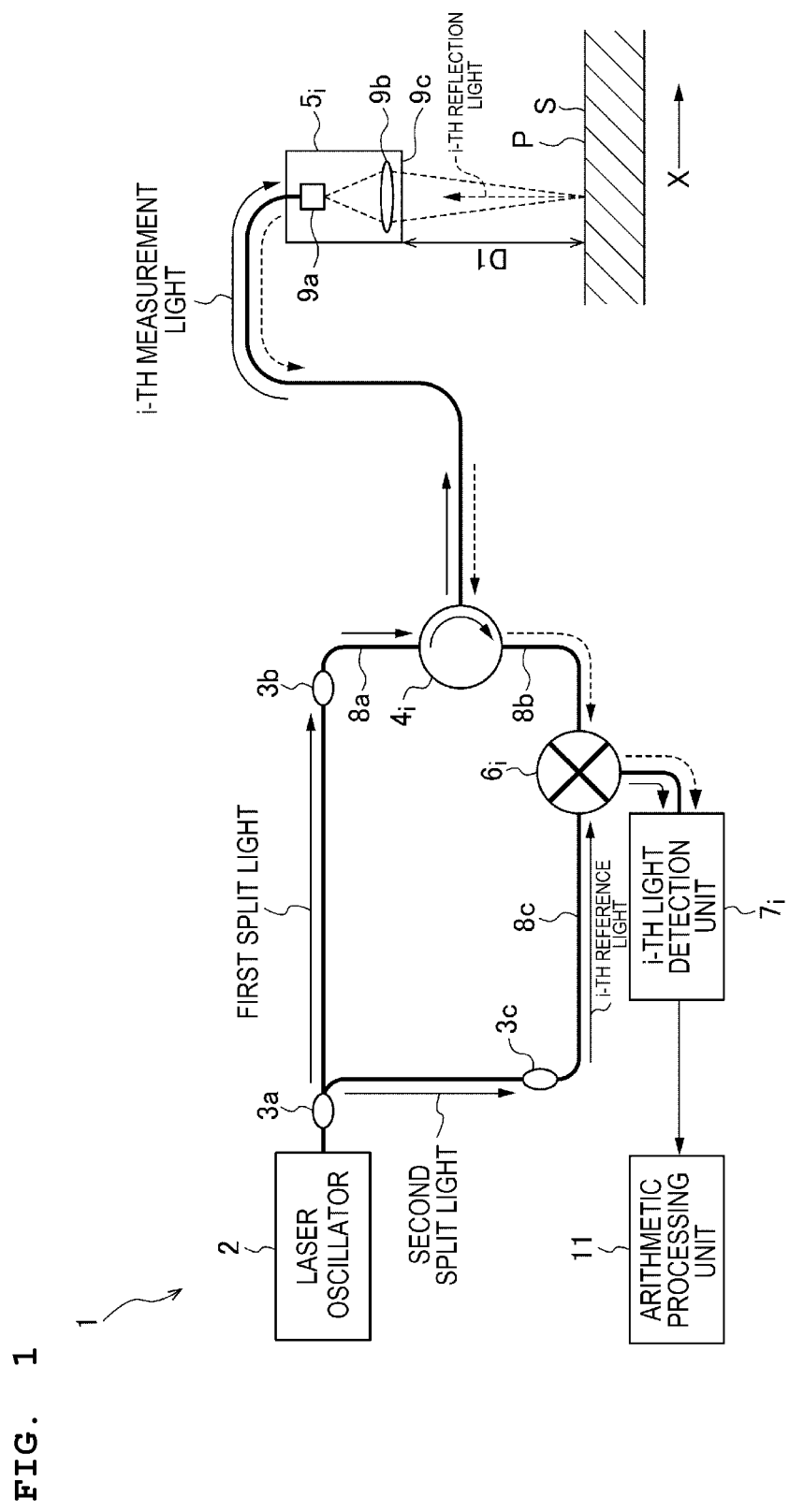
FIG. 1 is a schematic view illustrating a configuration of a measuring apparatus of the invention.

FIG. 1 is a schematic view illustrating the configuration of a measuring apparatus 1 in a first embodiment. In the first embodiment, the measuring apparatus 1 including one or two or more N i-th measuring heads $5_i$ (in this embodiment, i is an integer of greater than or equal to 1) will be described. In FIG. 1, only one measuring head 5 is representatively illustrated as one or N i-th measuring heads (hereinafter, also simply referred to as a measuring head 5) $5_i$, and the other i-th measuring heads are not illustrated.

For example, in the measuring apparatus 1 in which only one i-th measuring head $5_i$ is provided, the i-th measuring head $5_i$ is represented by a first measuring head $5_1$. On the other hand, in the measuring apparatus 1 in which N i-th measuring heads $5_i$ are provided, the i-th measuring heads $5_i$ are represented by a first measuring head $5_1$ to an N-th measuring head $5_N$, respectively. Note that, in a case where one i-th measuring head $5_i$ is provided and in a case where N i-th measuring heads $5_i$ are provided, the configuration of the i-th measuring head $5_i$ to be used is not limited to the same configuration, but for simplicity, a case where the configuration is the same will be described, and hereinafter, N i-th measuring heads $5_i$ will be described by focusing on only one i-th measuring head $5_i$.

In the first embodiment, a plate-like target P to be measured is applied as a target to be measured, and the i-th measuring head $5_i$ is provided in a position separated from a target surface S to be measured by a predetermined distance. Note that, an inclination angle of an optical axis of the i-th measuring head $5_i$ with respect to the target surface S to be measured will be described below by using FIG. 3 and FIG. 4, and first, the overall configuration of the measuring apparatus 1 will be described below.

In the i-th measuring head $5_i$, an irradiation and light receiving surface 9c in an end portion that irradiates laser light as i-th measurement light (also simply referred to as measurement light) is disposed toward the target surface S to be measured of the target P to be measured. Accordingly, the i-th measuring head $5_i$ irradiates the target surface S to be measured with the i-th measurement light exiting from the irradiation and light receiving surface 9c in the end portion. Simultaneously, the i-th measuring head $5_i$ receives i-th reflection light obtained by the i-th measurement light that is reflected on the target surface S to be measured with the irradiation and light receiving surface 9c.

Here, the measuring apparatus 1 of this embodiment includes a laser oscillator 2 oscillating FSF laser light, optical splitters 3a, 3b, and 3c, N i-th circulators (for example, a directional coupler or the like, hereinafter, also simply referred to as a circulator) $4_i$, N i-th couplers (for example, an optical fiber coupler or the like, hereinafter, also simply referred to as a coupler) $6_i$, N i-th light detection units (hereinafter, also simply referred to as a light detection unit) $7_i$, and an arithmetic processing unit 11, in addition to N i-th measuring heads $5_i$ described above. Note that, here, the numeric character of i is a numeric character corresponding to the number of measuring heads 5 as described above, and for example, the i-th coupler $6_i$ or the i-th light detection unit $7_i$ that is provided corresponding to the first measuring head 5 is also notated as a first coupler $6_1$ or a first light detection unit $7_1$.

The laser oscillator 2 is a laser oscillator oscillating FSF laser light. Here, the FSF laser light indicates laser light that is oscillated by feeding back light subjected to a frequency shift with a resonator (not illustrated) including an element changing the frequency of light (a frequency shift element).

Figure 2:
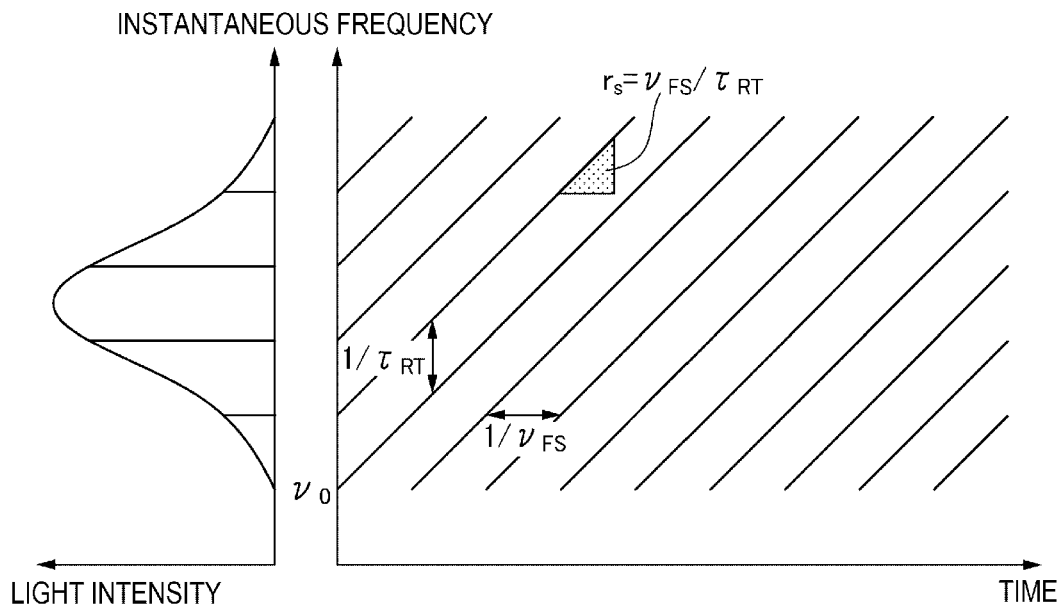
FIG. 2 is a schematic view schematically illustrating chirp frequency comb output of FSF laser light.

FIG. 2 is a diagram schematically illustrating the output of the FSF laser light. As illustrated in FIG. 2, the FSF laser light is amplified in accordance with a gain curve (a frequency-amplitude curve) of the resonator while a light wave in the resonator receives a frequency shift for each circulation, is attenuated, and finally, is extinguished. In oscillation output of the FSF laser light, a plurality of such instantaneous frequency components exists at a constant frequency interval in a comb shape.

In FIG. 2, $\tau_{RT}$ represents a circulation time of the resonator, and $v_{FS}$ represents a frequency shift amount per a circulation. $1/\tau_{RT}$ represents a longitudinal mode frequency interval (a chirp frequency comb interval) of the resonator, and $r_s$ represents a change amount per unit time of an instantaneous frequency of the FSF laser light, that is, a frequency modulation velocity.

As illustrated in FIG. 1, laser light output from the laser oscillator 2 (the FSF laser light) is incident on the optical splitter 3a through an optical fiber. The optical splitter 3a splits the laser light incident from the laser oscillator 2 into first split light and second split light. The first split light split in the optical splitter 3a is incident on the optical splitter 3b through the optical fiber.

The optical splitter 3b splits the first split light into N i-th measurement light rays. N i-th measurement light rays split in the optical splitter 3b are guided to the corresponding i-th measuring head 5 through an optical fiber light path 8a. Note that, one or N i-th measurement light rays will also be simply referred to as measurement light. Note that, in the case of N=1, that is, in a case where there is one measuring head 5, the optical splitter 3b is not necessary, and the first split light split by the optical splitter 3a becomes the measurement light (first measurement light), and is guided to the first measuring head 5 through the optical fiber light path 8a.

In the optical fiber light path 8a, the i-th circulator 4$_i$ is provided for each of the split i-th measurement light rays before reaching to the i-th measuring head 5. The i-th circulator 4$_i$ allows the i-th measurement light to exit to the i-th measuring head 5, and allows each of the N i-th reflection light rays incident from the i-th measuring head 5 to exit to the N i-th couplers 6$_i$.

In the i-th measuring head 5, an end portion 9a of the optical fiber light path 8a and a condenser lens 9b are provided. The i-th measuring head 5 allows the i-th measurement light that is transmitted from the laser oscillator 2 through the optical fiber light path 8a to exit from the end portion 9a of the optical fiber light path 8a and condenses the i-th measurement light by the condenser lens 9b, and then, irradiates the i-th measurement light toward the target surface S to be measured. The i-th measuring head 5, for example, irradiates the target surface S to be measured that is moved at a moving velocity V in a moving direction X (one direction in the plane of the flat target surface S to be measured of the target to be measured) by a conveying roller (not illustrated) with the i-th measurement light.

The i-th reflection light obtained by the i-th measurement light that is reflected on the target surface S to be measured is condensed by the condenser lens 9b, and then, is received by the end portion 9a of the optical fiber light path 8a, is guided to the i-th circulator 4$_i$ through the optical fiber light path 8a, and is guided to the i-th coupler 6$_i$ from the i-th circulator 4$_i$ through the optical fiber light path 8b.

On the other hand, the second split light that is split by the first optical splitter 3a is incident on the optical splitter 3c through the optical fiber light path 8c. The optical splitter 3c splits the second split light into N i-th reference light rays. The i-th reference light split in the optical splitter 3c is guided to the i-th coupler 6$_i$ through the optical fiber light path 8c. Note that, one or N i-th reference light rays will also be simply referred to as reference light. In the case of N=1, that is, in a case where there is one measuring head 5, the optical splitter 3c is not necessary, and the second split light split by the optical splitter 3a becomes the reference light (first reference light), and is guided to the first coupler 6$_1$ through the optical fiber light path 8c.

The i-th coupler 6$_i$ allows each of the i-th reference light and the i-th reflection light to be incident on the i-th light detection unit 7$_i$ through the optical fiber. The i-th light detection unit 7$_i$ receives the i-th reflection light and the i-th reference light. The i-th reflection light to be obtained for each of the i-th measuring heads 5$_i$ and the corresponding i-th reference light are respectively guided to the corresponding i-th light detection unit 7$_i$.

The i-th reflection light and the i-th reference light that are simultaneously incident on the i-th light detection unit 7$_i$ have a frequency difference corresponding to a difference between light path lengths of each of the laser light rays that exits from the laser oscillator 2 and then is incident on the i-th light detection unit 7$_i$, an i-th beat signal (hereinafter, also simply referred to as a beat signal) is generated by light interference between the i-th reflection light and the i-th reference light. The i-th light detection unit 7$_i$ detects the i-th beat signal, and transmits the i-th beat signal to the arithmetic processing unit 11 described below.

In a group of light rays detected by the i-th light detection unit 7$_i$, the arithmetic processing unit 11 detects the frequency of the i-th beat signal (an i-th beat frequency, or also simply referred to as a beat frequency) that is generated by the light interference between the i-th reflection light and the i-th reference light, within a predetermined detection frequency range. Note that, in order to suppress the influence of a temperature change of the optical fiber, for example, a frequency corresponding to a distance D1 to the target surface S to be measured from the i-th measuring head 5$_i$ can be used as the i-th beat frequency, instead of the i-th beat frequency that is generated by the light interference between the i-th reflection light and the i-th reference light. In the case of calculating such a frequency, the frequency can be obtained by subtracting the i-th beat frequency that is generated by the light interference between the i-th reflection light from the i-th measuring head 5$_i$ and the i-th reference light from the i-th beat frequency that is generated by the interference between the i-th reflection light and the i-th reference light.

Accordingly, the arithmetic processing unit 11 performs arithmetic processing (described below) using the obtained i-th beat frequency, and thus, it is possible to measure a separation displacement d that is a distance change to the target P to be measured from the measuring head, the moving velocity V when the target P to be measured is moved, and the moving direction.

(1-2) <Configuration of i-Th Measuring Head in First Embodiment>

Figure 3:
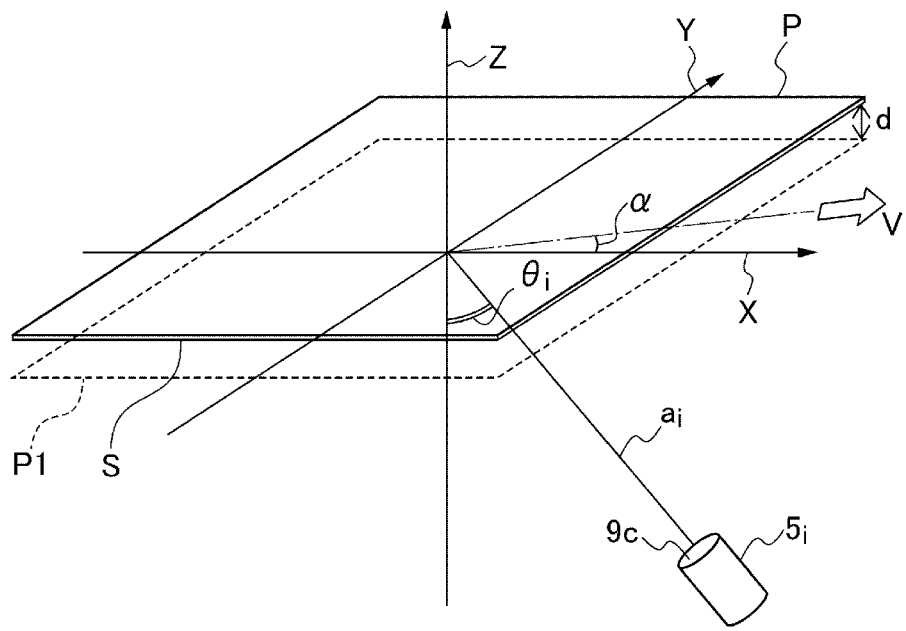
FIG. 3 is a schematic view for describing an i-th optical axis angle $\theta_i$ of an i-th measuring head.
Figure 4:
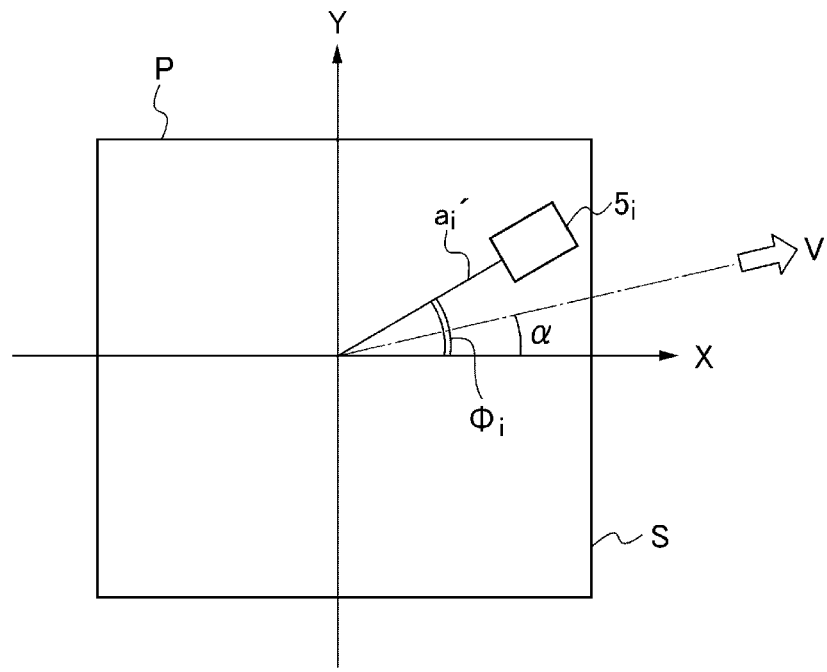
FIG. 4 is a schematic view for describing a projection angle $\theta_i$ of the i-th measuring head.

Next, a coordinate system and the inclination of the optical axis will be described by focusing on one i-th measuring head 5$_i$ of one or N i-th measuring heads 5$_i$, with FIG. 3 and FIG. 4. FIG. 3 is a schematic view illustrating the disposition of the i-th measuring head 5$_i$ and the target P to be measured in a spherical-coordinate system in which a normal direction of the target surface S to be measured is set as a Z-axis direction, and FIG. 4 is a schematic view when the disposition of the i-th measuring head 5$_i$ is seen from the Z-axis direction. In this embodiment, the Z-axis direction is a predetermined direction.

As illustrated in FIG. 3 and FIG. 4, an optical axis $a_i$ of the i-th measurement light that is irradiated from the i-th measuring head 5$_i$ is disposed to be inclined with respect to the Z-axis direction. Here, the inclination of the optical axis $a_i$ of the i-th measuring head 5$_i$ with respect to the Z-axis direction is defined as an i-th optical axis angle (hereinafter, also simply referred to as an optical axis angle) $\theta_i$.

As illustrated in FIG. 4, an X-axis direction and a Y-axis direction that are orthogonal to the Z-axis direction and are orthogonal to each other are defined, and an angle between projection $a_i'$ obtained by projecting the optical axis $a_i$ onto an XY plane and an X axis is defined as an i-th projection angle (hereinafter, also simply referred to as a projection angle) $\Phi_i$. As described above, an inclination angle of the optical axis $a_i$ of the i-th measuring head 5$_i$ can be defined by the i-th optical axis angle $\theta_i$ and the i-th projection angle $\Phi_i$.

In a case where N i-th measuring heads 5$_i$ are provided, the i-th optical axis angles $\theta_i$ of each of the i-th measuring heads 5$_i$ may be the same i-th optical axis angle $\theta_i$ for each of the i-th measuring heads 5$_i$, or may be different i-th optical axis angles $\theta_i$. In addition, in a case where N i-th measuring heads 5$_i$ are provided, the i-th projection angles $\Phi_i$ of each of the i-th measuring heads 5$_i$ may be the same i-th projection angle $\Phi_i$ for each of the i-th measuring heads 5$_i$, or may be different i-th projection angles $\Phi_i$. Here, in a case where N i-th measuring heads 5$_i$ are provided, it is desirable that each of the i-th measuring heads 5$_i$ is disposed in different positions, and thus, when the same i-th projection angle $\Phi_i$ is set in the plurality of i-th measuring heads $5_i$, it is desirable to set different i-th optical axis angles $\theta_i$, and when the same i-th optical axis angle $\theta_i$ is set in the plurality of i-th measuring heads $5_i$, it is desirable to set different i-th projection angles $\Phi_i$.

Figure 5:
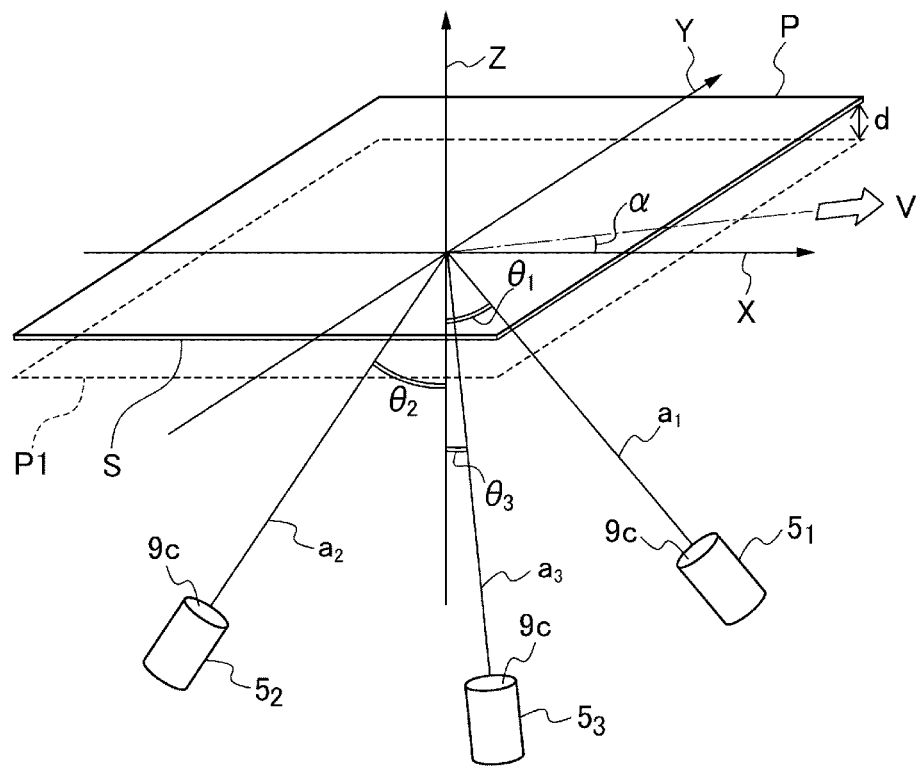
FIG. 5 is a schematic view illustrating a position of each i-th measuring head at the time of using three i-th measuring heads.

FIG. 5 is a schematic view illustrating an example when three i-th measuring heads $5_i$ (a first measuring head $5_1$, a second measuring head $5_2$, and a third measuring head $5_3$ (i=1, 2, 3)) are provided. In this case, the target surface S to be measured is irradiated with the first measurement light from the first measuring head $5_1$, the target surface S to be measured is irradiated with the second measurement light from the second measuring head $5_2$, and the target surface S to be measured is irradiated with the third measurement light from the third measuring head $5_3$.

In FIG. 5, the first measuring head $5_1$, the second measuring head $5_2$, and the third measuring head $5_3$ are disposed in different positions with respect to the target P to be measured, an inclination angle of an optical axis $a_1$ of the first measurement light that is irradiated from the first measuring head $5_1$ (a first optical axis angle $\theta_1$ and a first projection angle $\Phi_1$ (not illustrated)), an inclination angle of an optical axis $a_2$ of the second measurement light that is irradiated from the second measuring head $5_2$ (a second optical axis angle $\theta_2$ and a second projection angle $\Phi_2$ (not illustrated)), and an inclination angle of an optical axis $a_3$ of the third measurement light that is irradiated from the third measuring head $5_3$ (a third optical axis angle $\theta_3$ and a third projection angle $\Phi_3$ (not illustrated)) are set to a predetermined angle, respectively.

In a case where four or more i-th measuring heads $5_i$ are provided, as with the configuration as illustrated in FIG. 5, it is desirable that each of the i-th measuring heads $5_i$ is disposed in different positions.

In this embodiment, as illustrated in FIG. 3 and FIG. 5, the displacement of the target P to be measured in the Z-axis direction from a predetermined reference position is set to a separation displacement d. Note that, P1 in FIG. 3 and FIG. 5 represents the target to be measured in a reference position. In addition, the target P to be measured is relatively moved with respect to the measuring apparatus 1, and as illustrated in FIG. 4, an angle between the moving direction projected onto the XY plane and the X-axis is defined as a moving direction angle α, and a velocity projected onto the XY plane is defined as the moving velocity V. For example, in a case where the target P to be measured is moved in the X-axis direction, the moving direction angle α of the target P to be measured is 0°.

(1-3) <Outline of Measuring Method of Invention>

Next, in this embodiment, a measuring method of the moving velocity V and the separation displacement d will be described. Here, the i-th beat frequency obtained from the i-th reflection light that is reflected by irradiating the target surface S to be measured of a target P1 to be measured in a reference state (for example, a state in which the target P1 to be measured remains still in a reference position) with the i-th measurement light, and the i-th reference light is defined as an i-th reference frequency (hereinafter, also simply referred to as a reference frequency). In addition, in a position separated from the reference position in the Z-axis direction by d, the i-th beat frequency is obtained from the i-th reflection light that is reflected by irradiating the target surface S to be measured of the target P to be measured that is moved in parallel to the XY plane at the moving velocity V in the moving direction (the direction of the moving direction angle α) with the i-th measurement light, and the i-th reference light.

In a case where a difference between the i-th reference frequency and the i-th beat frequency (an i-th frequency difference, or simply referred to as a frequency difference) is set to $\Delta f_i$, an i-th frequency difference $\Delta f_i$ of the first embodiment is affected by the separation displacement d and a Doppler shift, and thus, the present inventors have derived that $\Delta f_i$ can be represented by Expression (1) described below.

(Expression 1)

$$\Delta f_i = k(d/\cos \theta_i) + ((2V \cos \alpha \cos \Phi_i \sin \theta_i)/\lambda) + ((2V \sin \alpha \sin \Phi_i \sin \theta_i)/\lambda) \quad (1)$$

$\theta_i$ represents the i-th optical axis angle described above, $\Phi_i$ represents the i-th projection angle described above, and $\lambda$ represents the wavelength of laser. k, for example, is a constant number indicating a relationship between a change in the distance of the target P to be measured with respect to the i-th measuring head $5_i$ and a change in the frequency of the laser light.

In Expression (1) described above, the first term is a term representing a frequency change amount of laser light (the i-th reflection light) due to a change in a distance to the target P to be measured from the i-th measuring head $5_i$. On the other hand, in Expression (1) described above, the second term is a term representing a frequency change amount of laser light (the i-th reflection light) due to the influence of a Doppler shift in the X-axis direction when the target P to be measured is moved in a predetermined moving direction parallel to the XY plane, and the third term is a term representing a frequency change amount of laser light (the i-th reflection light) due to the influence of a Doppler shift in the Y-axis direction.

In a case where the N i-th measuring heads $5_i$ have the same configuration, the constant number k is the same value in any i-th measuring head $5_i$. In this embodiment, the constant number k is not limited to be the same, but in the following description of all embodiments, for simplicity, the constant number k will be described as the same value in any i-th measuring head $5_i$.

In the calculation of the i-th frequency difference $\Delta f_i$, the i-th beat frequency detected when the target P to be measured relatively remains still in the reference position may not be used as the i-th reference frequency. For example, the i-th beat frequency detected when the target P to be measured is moved at a reference velocity in the reference position may not be used as the i-th reference frequency, and the i-th frequency difference $\Delta f_i$ may be calculated from a difference between the i-th reference frequency and the i-th beat frequency detected when the target P to be measured is moved at a velocity other than the reference velocity in a predetermined position.

The wavelength λ of the laser light can be acquired by being measured in advance with a spectroscope or the like. In Expression (1) described above, for example, the separation displacement d is provided, the target P to be measured remains still in each of different positions, and the frequency of the i-th reflection light from the target P to be measured in each of the positions is measured, and thus, the constant number k can be calculated on the basis of an expression of $k=\Delta f_i/d$ from the frequency change amount of the i-th reflection light and the separation displacement d. In addition, it is also possible to obtain k from an expression of $k=2r_s/c$ ($r_s$ is a frequency modulation velocity, and c is the velocity of light in the air).

Here, the i-th optical axis angle $\theta_i$, the i-th projection angle $\Phi_i$, the constant number k, and the wavelength $\Lambda$ are a fixed value, and thus, for example, in a case where there are at least three i-th measuring heads $5_i$, three values of the separation displacement d, the moving velocity V and the moving direction angle $\alpha$, which are unknown, can be obtained by measuring the i-th frequency difference $\Delta f_i$ (i=1, 2, 3). In a case where there are four or more i-th measuring heads $5_i$, three values of the separation displacements d, the moving velocities V and the moving direction angles $\alpha$ can be respectively obtained by a combination of three i-th measuring heads $5_i$ arbitrarily selected from four or more i-th measuring heads $5_i$. The separation displacements d, the moving velocities V, and the moving direction angles $\alpha$ respectively obtained by the combination of three i-th measuring heads $5_i$ that are arbitrarily selected are subjected to statistic processing (for example, the calculation of an average value), and thus, measurement can be performed with a higher accuracy.

For example, in a case where four i-th measuring heads $5i$ (a first measuring head $5_1$, a second measuring head $5_2$, a third measuring head $5_3$, and a fourth measuring head $5_4$) are provided, there are four combinations of three i-th measuring heads that can be obtained by four i-th measuring heads $5_i$. Accordingly, in four separation displacements d, four moving velocities V, and four moving direction angles $\alpha$ respectively obtained by four combinations of the four i-th measuring heads $5_i$, in the case of obtaining an average value with respect to each of the separation displacements d, the moving velocities V, and the moving direction angles $\alpha$, it is possible to more accurately obtain the separation displacement d, the moving velocity V, and the moving direction angle $\alpha$.

(1-4) <Arithmetic Processing Unit in First Embodiment>

Next, the arithmetic processing unit 11 executing the measuring method described above will be described below. The arithmetic processing unit 11 has a microcomputer configuration including a central processing unit (CPU), a random access memory (RAM), read only memory (ROM), which are not illustrated, and the like, and integrally controls various circuit units in the arithmetic processing unit 11 by loading various programs that are stored in advance in the ROM into the RAM to be launched.

Figure 6:
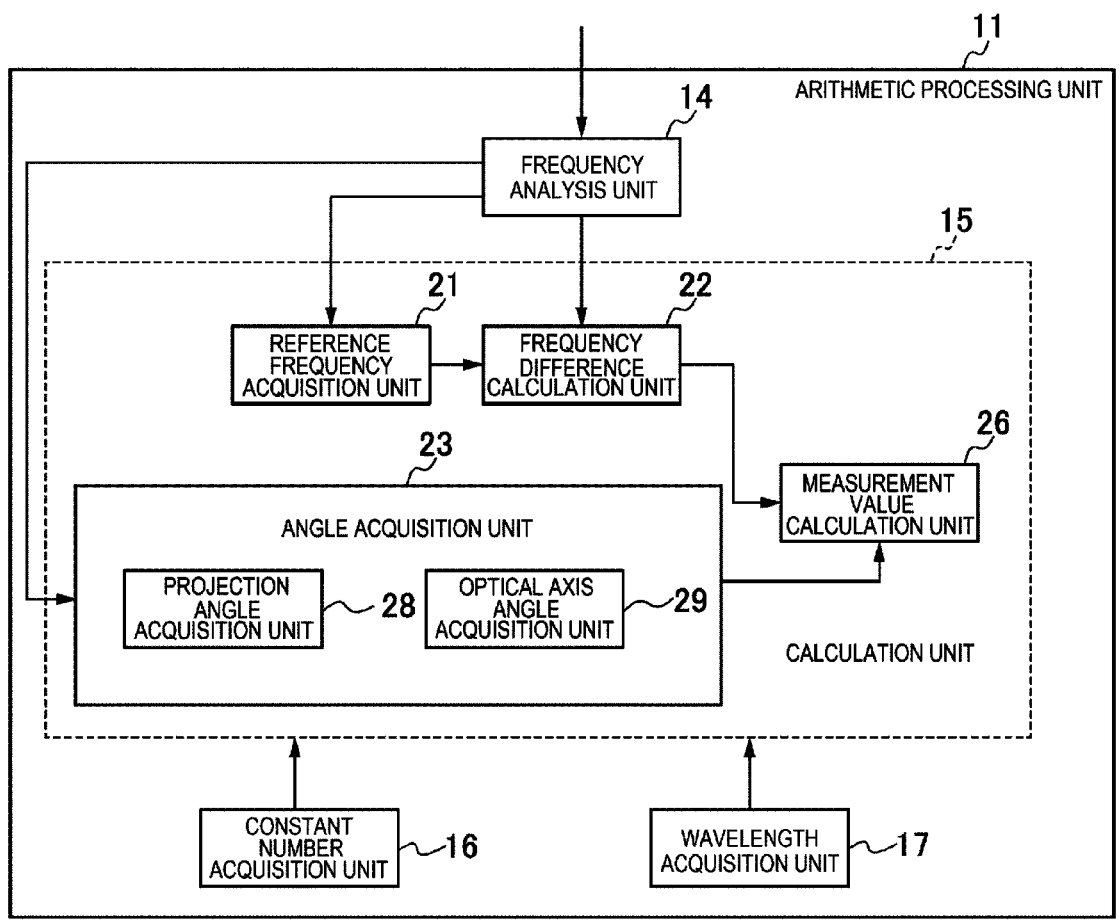
FIG. 6 is a block diagram illustrating a circuit configuration of an arithmetic processing unit according to a first embodiment and a sixth embodiment, which is capable of measuring a separation displacement, a moving velocity, and a moving direction.

The arithmetic processing unit 11 according to the first embodiment is capable of measuring at least one or more of the separation displacement d of the target P to be measured, the moving velocity V of the target P to be measured, and the moving direction angle $\alpha$ of the target P to be measured, on the basis of Expression (1) described above. FIG. 6 is a block diagram illustrating a circuit configuration of the arithmetic processing unit 11. As illustrated in FIG. 6, the arithmetic processing unit 11 according to the first embodiment includes a frequency analysis unit 14, a calculation unit 15, a constant number acquisition unit 16, and a wavelength acquisition unit 17.

The frequency analysis unit 14 receives the i-th beat signal that is generated by the light interference between the i-th reflection light and the i-th reference light from the i-th light detection unit $7i$ (FIG. 1), detects the frequency of the i-th beat signal (the i-th beat frequency) within a predetermined detection frequency range, and transmits a detection result thereof to a reference frequency acquisition unit 21 and a frequency difference calculation unit 22 of the calculation unit 15, and as necessary, to an angle acquisition unit 23. Here, the calculation unit 15 of the first embodiment includes the reference frequency acquisition unit 21, the frequency difference calculation unit 22, the angle acquisition unit 23, and a measurement value calculation unit 26.

The reference frequency acquisition unit 21 acquires the i-th reference frequency that is used at the time of obtaining the i-th frequency difference $\Delta f_i$ used in Expression (1) described above. The reference frequency acquisition unit 21 stores the i-th beat frequency in the reference state, that is, the i-th reference frequency, which is received from the frequency analysis unit 14. The reference frequency acquisition unit 21 transmits the i-th reference frequency to the frequency difference calculation unit 22.

The frequency difference calculation unit 22 receives a signal indicating the i-th beat frequency of the target P to be measured in a movement state from the frequency analysis unit 14, and receives the i-th reference frequency from the reference frequency acquisition unit 21.

Accordingly, the frequency difference calculation unit 22 calculates a difference between the i-th beat frequency that is detected from the target P to be measured in the movement state and the i-th reference frequency that is detected from the target P to be measured in the reference state, as the i-th frequency difference $\Delta f_i$. The frequency difference calculation unit transmits information indicating the i-th frequency difference $\Delta f_i$ that is a calculation result to the measurement value calculation unit 26.

The angle acquisition unit 23 includes a projection angle acquisition unit 28 and an optical axis angle acquisition unit 29. The optical axis angle acquisition unit 29 acquires the i-th optical axis angle $\theta_i$ used in Expression (1) described above. The optical axis angle acquisition unit 29 may calculate the i-th optical axis angle $\theta_i$ by arithmetic processing, and may acquire an actually measured value by measuring the i-th optical axis angle $\theta_i$ with a measuring unit, and may simply store in advance the i-th optical axis angle $\theta_i$. The optical axis angle acquisition unit 29 transmits information indicating the i-th optical axis angle $\theta_i$ to the measurement value calculation unit 26. Note that, a method for calculating the i-th optical axis angle $\theta_i$ by the arithmetic processing will be described in "(9) <Calibration of i-th Optical Axis Angle and i-th Projection Angle according to Arithmetic Processing>" described below.

The projection angle acquisition unit 28 acquires the i-th projection angle $\Phi_i$ used in Expression (1) described above. The projection angle acquisition unit 28 may calculate the i-th projection angle $\Phi_i$ by arithmetic processing, and may acquire an actually measured value by measuring the i-th projection angle $\Phi_i$ with a measuring unit, and may simply store in advance the i-th projection angle $\Phi_i$. The projection angle acquisition unit 28 transmits information indicating the i-th projection angle $\Phi_i$ to the measurement value calculation unit 26. Note that, a method for calculating the i-th projection angle $\Phi_i$ by the arithmetic processing will be described in "(9) <Calibration of i-th Optical Axis Angle and i-th Projection Angle according to Arithmetic Processing>" described below.

The constant number acquisition unit 16 acquires the constant number k used in Expression (1) described above. As described above, the constant number acquisition unit 16 may obtain k from the expression of $k=\Delta f_i/d$ or $k=2r_s/c$ ($r_s$ is the frequency modulation velocity, and c is the velocity of the light in the air), and may simply store in advance constant number k. The constant number acquisition unit 16 transmits information indicating the constant number k to the measurement value calculation unit 26.

The wavelength acquisition unit 17, for example, is a spectroscope or the like, and acquires the wavelength λ by measuring the wavelength λ of laser light that is oscillated by the laser oscillator 2. The wavelength acquisition unit 17 transmits information indicating the wavelength λ to the measurement value calculation unit 26.

The measurement value calculation unit 26 performs the arithmetic processing on the basis of Expression (1) described above, by using the i-th frequency difference $\Delta f_i$, the i-th optical axis angle $\theta_i$, the i-th projection angle $\Phi_i$, the constant number k, and the wavelength λ of the laser light, which are acquired, and thus, is capable of calculating the relative moving velocity V of the target P to be measured with respect to the i-th measuring head $5_i$, the moving direction angle α, and the separation displacement d.

In the measuring apparatus of the first embodiment, on the basis of Expression (1) described above, the relative moving velocity V, the moving direction angle α, and the separation displacement d of the target P to be measured are calculated by the measurement value calculation unit 26, but in a case where all of the moving velocity V, the moving direction angle α, and the separation displacement d are calculated as an unknown value, at least three or more i-th measuring heads $5_i$ are required. On the other hand, in a case where only a part of the moving velocity V, the moving direction angle α, and the separation displacement d is calculated, a part of the moving velocity V, the moving direction angle α, and the separation displacement d is set as a known value, and thus, it is possible to reduce the number of i-th measuring heads $5_i$.

(1-5) <Measurement Processing Procedure>

Figure 7:
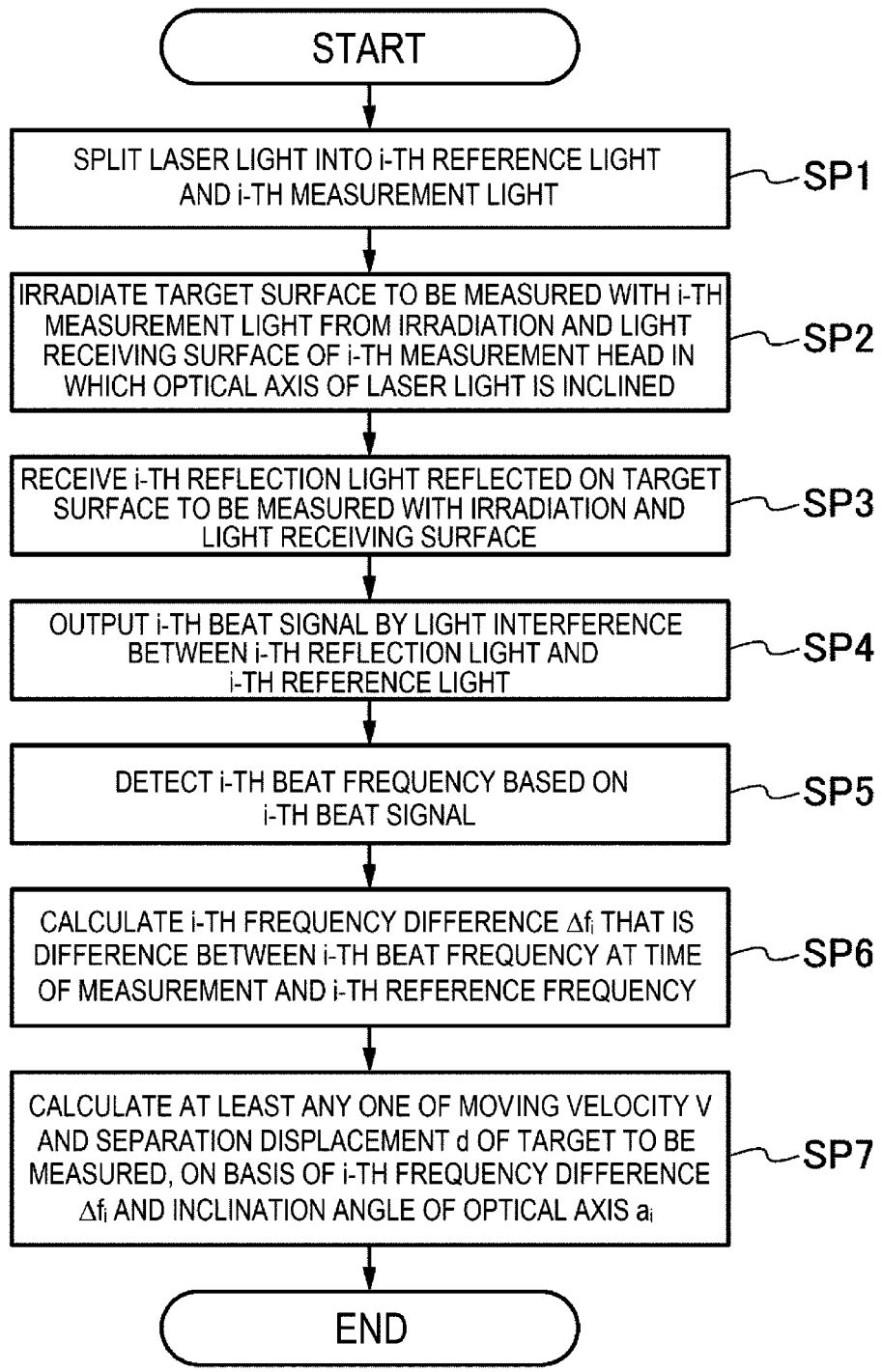
FIG. 7 is a flowchart illustrating a measurement processing procedure.

Next, in the measuring apparatus 1 described above, a measurement processing procedure at the time of measuring at least any one of the moving velocity V and the separation displacement d of the target P to be measured will be described below by using a flowchart of FIG. 7. As illustrated in FIG. 7, in a case where the measurement processing procedure is started, in step SP1, the measuring apparatus 1 splits the laser light output from the laser oscillator 2 (the FSF laser light) into the i-th reference light and the i-th measurement light, and proceeds to step SP2.

In step SP2, the measuring apparatus 1 irradiates the target surface S to be measured with the i-th measurement light from the irradiation and light receiving surface 9c of the i-th measuring head $5_i$ in which the optical axis $a_i$ of the laser light is inclined, and proceeds to step SP3. In step SP3, the measuring apparatus 1 receives the i-th reflection light obtained by the i-th measurement light that is reflected on the target surface S to be measured with the irradiation and light receiving surface 9c of the i-th measuring head $5_i$, and proceeds to step SP4.

In step SP4, the measuring apparatus 1 outputs the i-th beat signal by the light interference between the i-th reflection light and the i-th reference light, and proceeds to step SP5. In step SP5, the measuring apparatus 1 detects the i-th beat frequency based on the i-th beat signal by the arithmetic processing unit 11, and proceeds to step SP6.

In step SP6, the measuring apparatus 1 obtains the i-th beat frequency when the target P to be measured is in the predetermined reference state, as the i-th reference frequency, calculates the i-th frequency difference $\Delta f_i$ that is a difference between the i-th beat frequency at the time of measurement, which is detected in step SP5, and the i-th reference frequency, and proceeds to step SP7. In step SP7, the measuring apparatus 1 calculates at least any one of the moving velocity V and the separation displacement d of the target P to be measured, on the basis of the i-th frequency difference $\Delta f_i$ obtained in step SP6 and the inclination angle of the optical axis $a_i$ of the laser light, and ends the measurement processing procedure described above.

(1-6) <Operation and Effect>

In the configuration described above, the measuring apparatus 1 of this embodiment detects the i-th beat frequency based on the i-th beat signal, calculates the i-th frequency difference $\Delta f_i$ that is a difference between the i-th beat frequency at the time of measurement and the i-th reference frequency that is the i-th beat frequency in the predetermined reference state, and acquires the i-th frequency difference $\Delta f_i$ and the inclination angle of the optical axis $a_i$ of the laser light (the i-th optical axis angle $\theta_i$ and the i-th projection angle $\Phi_i$) that is disposed to be inclined.

The measuring apparatus 1, for example, is capable of calculating the moving velocity V, the moving direction angle α, and the separation displacement d of the target P to be measured, on the basis of Expression (1) described above, considering the influence of a Doppler shift that occurs due to the movement of the target P to be measured in a direction orthogonal to a displacement measurement direction, by using the i-th frequency difference $\Delta f_i$ and the inclination angle of the optical axis $a_i$ of the laser light, which are acquired. In this case, the measuring apparatus 1 is capable of measuring the relative moving velocity V of the target P to be measured and the separation displacement d of the target P to be measured in consideration of the influence of a Doppler shift, and thus, even in a case where the target P to be measured is moved in the direction orthogonal to the displacement measurement direction, it is possible to accurately measure the relative moving velocity V of the target P to be measured and the separation displacement d of the target P to be measured.

(2) <Second Embodiment>

Next, a second embodiment of the invention will be described in detail. A measuring apparatus of the second embodiment, for example, has a configuration in which at least two or more i-th measuring heads $5_i$ are provided, and is capable of measuring the relative moving velocity V and the separation displacement d of the target P to be measured by setting the moving direction in which the target P to be measured is moved as known.

Figure 8:
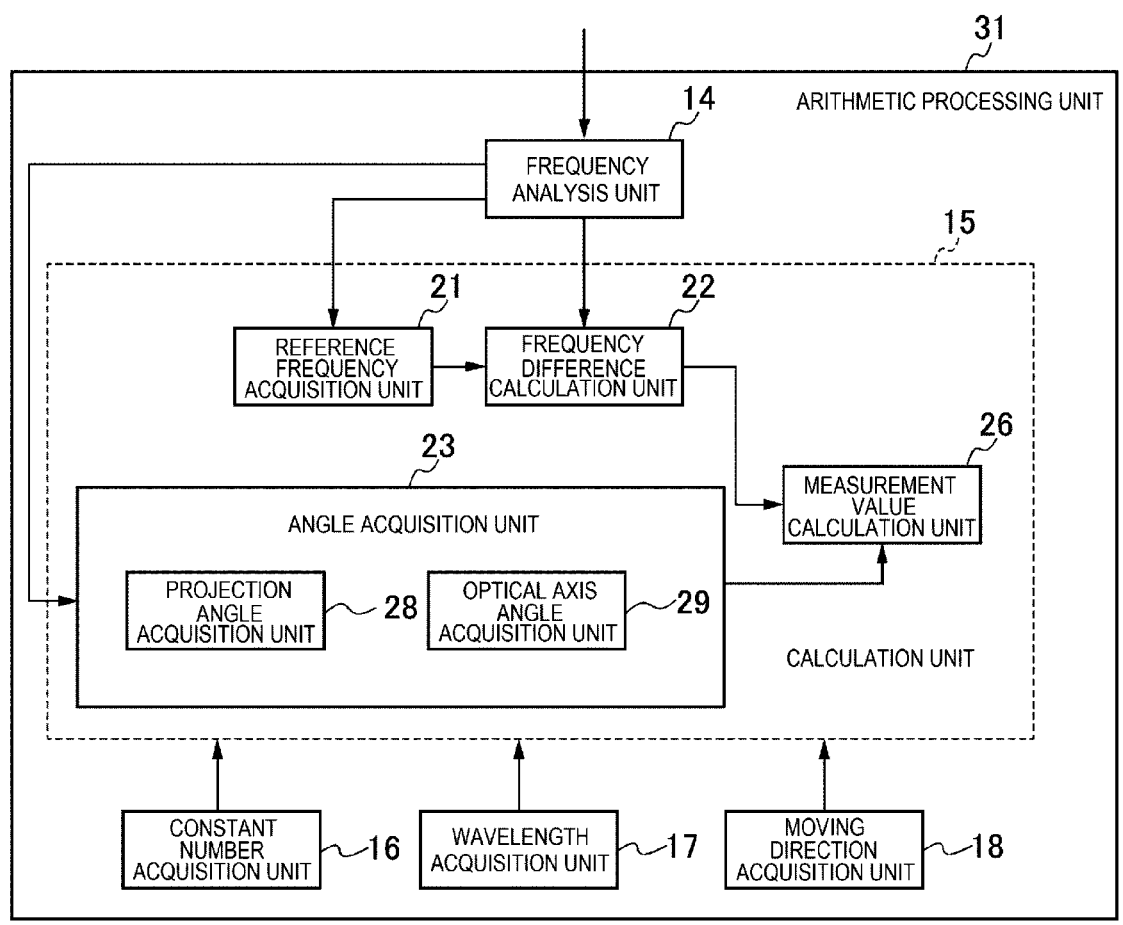
FIG. 8 is a block diagram illustrating a circuit configuration of an arithmetic processing unit according to a second embodiment, which is capable of measuring a separation displacement and a moving velocity.

As illustrated in FIG. 8, the measuring apparatus of the second embodiment is different from that of the first embodiment described above in that a moving direction acquisition unit 18 is added to an arithmetic processing unit 31. Here, the second embodiment will be described below by focusing on the difference from the first embodiment, and the description of the same configuration as that of the first embodiment, such as the i-th measuring head $5_i$, will be omitted.

(2-1) <Arithmetic Processing Unit According to Second Embodiment>

FIG. 8 in which the same reference numerals are applied to the same configurations as those of FIG. 6 is a block diagram illustrating the configuration of the arithmetic processing unit 31 of the second embodiment to which the moving direction acquisition unit 18 is added. Note that, in the following description, the description of the configurations to which the same reference numerals as those of the first embodiment is repeated, and thus, the description thereof will be omitted.

The arithmetic processing unit 31 of the second embodiment includes the moving direction acquisition unit 18, and acquires information indicating the moving direction of the target P to be measured from the outside by the moving direction acquisition unit 18. Note that, here, a case where the moving direction of the target P to be measured is acquired by the moving direction acquisition unit 18, as the information indicating the moving direction, will be described, but the invention is not limited thereto, and the moving direction angle α that specifies the moving direction in which the target P to be measured is moved may be acquired by the moving direction acquisition unit 18, as the information indicating the moving direction of the target P to be measured.

In this case, the moving direction acquisition unit may acquire the information indicating the moving direction of the target P to be measured by an external sensor, may acquire the information indicating the moving direction as a constant number in a case where the moving direction of the target P to be measured is constant, or may only store in advance the constant number. The moving direction acquisition unit 18 transmits the information indicating the moving direction of the target P to be measured to the measurement value calculation unit 26.

In the measuring apparatus of the second embodiment, the information indicating the moving direction of the target P to be measured is known, and thus, the moving direction angle α in Expression (1) described above can be defined, and in a case where there are at least two or more i-th measuring heads $5_i$, the moving velocity V of the target P to be measured and the separation displacement d of the target P to be measured, which are unknown, can be obtained from Expression (1) described above by the measurement value calculation unit 26.

In a case where there are three or more i-th measuring heads $5_i$, the measurement value calculation unit 26 is capable of calculating the moving velocity V of the target P to be measured and the separation displacement d of the target P to be measured for each combination of two i-th measuring heads $5_i$ of three or more i-th measuring heads $5_i$, and is capable of performing statistic processing (for example, the calculation of an average value) with respect to the moving velocity V and the separation displacement d. Accordingly, in the second embodiment, it is possible to measure the moving velocity V and the separation displacement d with a high accuracy.

For example, in a case where four i-th measuring heads $5_i$ (the first measuring head $5_1$, the second measuring head $5_2$, the third measuring head $5_3$, and the fourth measuring head $5_4$) are provided, there are six combinations of two i-th measuring heads $5_i$ that can be obtained by four i-th measuring heads $5_i$. Accordingly, in six moving velocities V and six separation displacements d respectively obtained by six combinations of four i-th measuring heads $5_i$, in a case where the measurement value calculation unit 26 obtains an average value with respect to each of the moving velocities V and the separation displacements d, it is possible to more accurately obtain the moving velocity V and the separation displacement d.

In particular, in a case where the moving direction of the target P to be measured is known, the number of i-th measuring heads $5_i$ is set to 2 which is the minimum number, the first projection angle $\Phi_1$ is set to be coincident with the moving direction of the target P to be measured, and the second projection angle $\Phi_2$ is set to be different from the first projection angle $\Phi_1$ by π rad, and the projections $a_i'$ of the optical axes $a_i$ of two i-th measuring heads $5_i$ are disposed on the same straight line, and thus, Expression (1) described above can be represented as Expression (2) described below.

(Expression 2)

$\Delta f_1 = k(d/\cos\theta_1) + (2V\sin\theta_1)/\lambda$ $\Delta f_2 = k(d/\cos\theta_2) - (2V\sin\theta_2)/\lambda$ (2)

Accordingly, in the arithmetic processing unit 31 of the second embodiment, the i-th optical axis angle $\theta_i$, the constant number k, and the wavelength λ are a fixed value, and thus, for example, the i-th frequency difference $\Delta f_i$ is acquired, and the moving velocity V and the separation displacement d of the target P to be measured can be calculated on the basis of Expression (2) described above, considering the influence of a Doppler shift that occurs due to the movement of the target P to be measured in the direction orthogonal to the displacement measurement direction, by the measurement value calculation unit 26.

(2-2) <Operation and Effect>

As described above, in the measuring apparatus of the second embodiment, the relative moving velocity V of the target P to be measured and the separation displacement d of the target P to be measured can be measured in consideration of the influence of a Doppler shift that occurs due to the movement of the target P to be measured in the direction orthogonal to the displacement measurement direction, and thus, even in a case where the target P to be measured is moved in the direction orthogonal to the displacement measurement direction, it is possible to accurately measure the relative moving velocity V of the target P to be measured and the separation displacement d of the target P to be measured.

(3) <Third Embodiment>

Next, a third embodiment of the invention will be described in detail. A measuring apparatus of the third embodiment, for example, has a configuration in which at least two or more i-th measuring heads $5_i$ are provided, and is capable of measuring the relative moving velocity V of the target P to be measured and the moving direction angle α indicating the moving direction by setting the separation displacement d of the target P to be measured as known.

Figure 9:
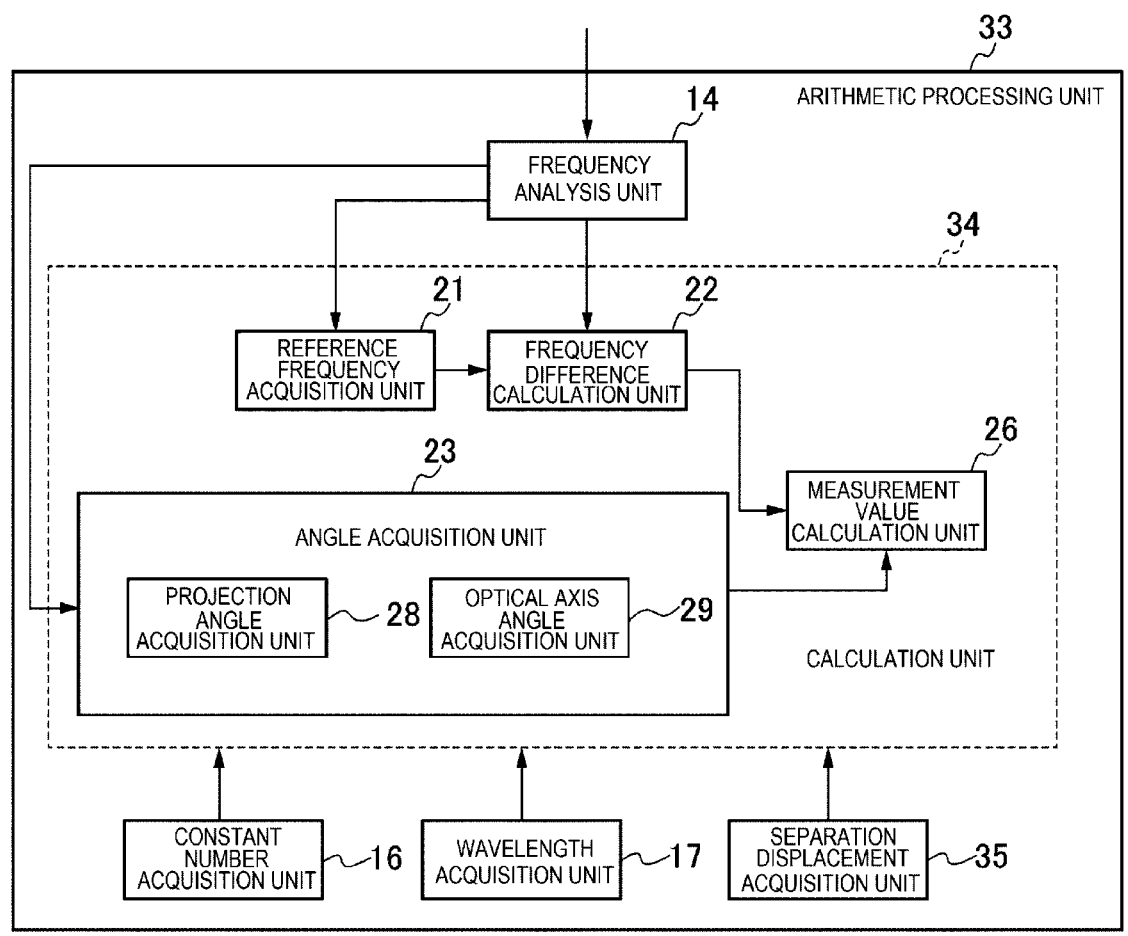
FIG. 9 is a block diagram illustrating a circuit configuration of an arithmetic processing unit according to a third embodiment, which is capable of measuring a moving velocity and a moving direction.

As illustrated in FIG. 9, the measuring apparatus of the third embodiment is different from that of the first embodiment described above in that a separation displacement acquisition unit 35 is added to an arithmetic processing unit 33. Here, the third embodiment will be described below by focusing on the difference from the first embodiment, and the description of the same configuration as that of the first embodiment, such as the i-th measuring head $5_i$, will be omitted.

(3-1) <Arithmetic Processing Unit According to Third Embodiment>

FIG. 9 in which the same reference numerals are applied to the same configurations as those of FIG. 6 is a block diagram illustrating the configuration of the arithmetic processing unit 33 of the third embodiment. Note that, in the following description, the description of the configurations to which the same reference numerals as those of the first embodiment is repeated, and thus, the description thereof will be omitted.

The arithmetic processing unit 33 of the third embodiment includes the separation displacement acquisition unit 35, and acquires information indicating the separation displacement d of the target P to be measured from the outside by the separation displacement acquisition unit 35. In this case, the separation displacement acquisition unit 35 may acquire the separation displacement d by an external sensor such as a rangefinder, may acquire the separation displacement d as a constant number in a case where the separation displacement d is constant, or may only store in advance the constant number. The separation displacement acquisition unit 35 transmits the information indicating the separation displacement d to the measurement value calculation unit 26 of a calculation unit 34.

In the measuring apparatus of the third embodiment, the information indicating the separation displacement d of the target P to be measured is known, and thus, the separation displacement d in Expression (1) described above can be defined, and in a case where there are at least two or more i-th measuring heads $5_i$, the moving velocity V of the target P to be measured and the moving direction angle α of the target P to be measured, which are unknown, can be obtained from Expression (1) described above by the measurement value calculation unit 26.

In a case where the target P to be measured is moved while remaining the reference position, the separation displacement d can be defined as zero. In a case where the separation displacement d is defined as zero, the separation displacement d in Expression (1) described above becomes zero, and thus, in Expression (1) described above, the first term on the right side (k(d/cos $θ_i$)) representing the frequency change amount of the laser light (the i-th reflection light) due to the change in the distance to the target P to be measured from the i-th measuring head $5_i$ is not necessary.

For this reason, in this case, in the arithmetic processing unit 33 illustrated in FIG. 9, the constant number acquisition unit 16 acquiring the constant number k and the separation displacement acquisition unit 35 acquiring the separation displacement d are not necessary. Accordingly, in the measuring apparatus of the third embodiment, at least two or more i-th measuring heads $5_i$ are provided, and thus, the moving velocity V of the target P to be measured and the moving direction angle α indicating the moving direction, which are unknown, can be obtained from Expression (3) described below.

(Expression 3)

$Δf_1 = 2V(\cos α \cos Φ_1 \sin θ_1 + \sin α \sin Φ_1 \sin θ_1)/λ$ $Δf_2 = 2V(\cos α \cos Φ_2 \sin θ_2 + \sin α \sin Φ_2 \sin θ_2)/λ$ (3)

In the third embodiment, as with the first embodiment or the second embodiment described above, in a case where there are three or more i-th measuring heads $5_i$, the moving velocity V of the target P to be measured and the moving direction angle α of the moving direction of the target P to be measured can be calculated for each combination of two i-th measuring heads $5_i$ of three or more i-th measuring heads $5_i$, and thus, a plurality of moving velocities V and a plurality of moving direction angles α are subjected to statistic processing (for example, the calculation of an average value), and therefore, it is possible to measure each of the moving velocity V and the moving direction angle α with a high accuracy.

(3-2) <Operation and Effect>

As described above, in the measuring apparatus of the third embodiment, the relative moving velocity V of the target P to be measured and the moving direction angle α at which the target P to be measured is moved can be measured in consideration of the influence of a Doppler shift that occurs due to the movement of the target P to be measured in the direction orthogonal to the displacement measurement direction, and thus, even in a case where the target P to be measured is moved in the direction orthogonal to the displacement measurement direction, it is possible to accurately measure the relative moving velocity V and the moving direction angle α of the target P to be measured.

(4) <Fourth Embodiment>

Next, a fourth embodiment of the invention will be described in detail. A measuring apparatus of the fourth embodiment is capable of measuring the relative moving velocity V of the target P to be measured only with at least one i-th measuring head $5_i$ by setting the moving direction angle α that is the information indicating the moving direction of the target P to be measured and the separation displacement d of the target P to be measured as known.

Figure 10:
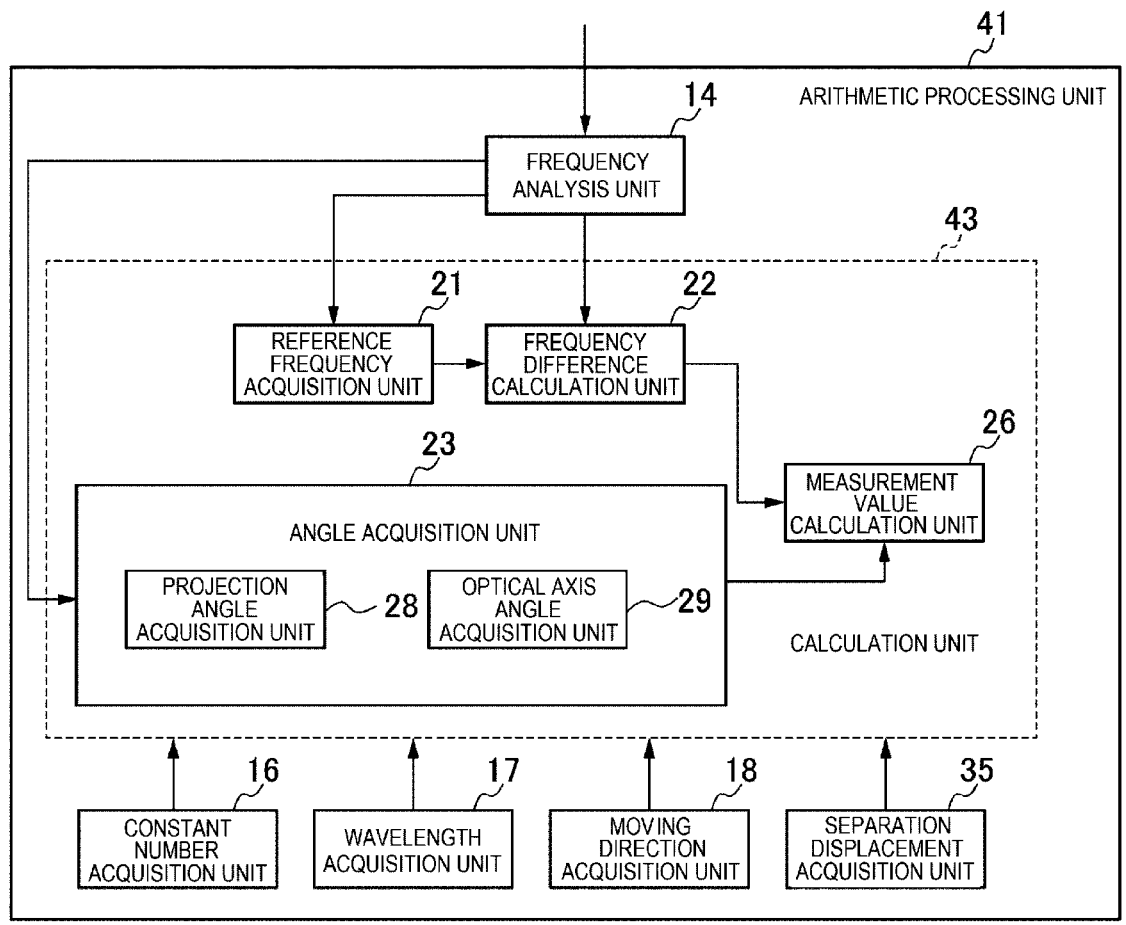
FIG. 10 is a block diagram illustrating a circuit configuration of an arithmetic processing unit according to a fourth embodiment, which is capable of measuring a moving velocity.

As illustrated in FIG. 10, the measuring apparatus of the fourth embodiment is different from that of the first embodiment described above in that the moving direction acquisition unit 18 and the separation displacement acquisition unit 35 are added to an arithmetic processing unit 41. Here, the fourth embodiment will be described below by focusing on the difference from the first embodiment, and the description of the same configuration as that of the first embodiment, such as the i-th measuring head $5_i$, will be omitted.

(4-1) <Arithmetic Processing Unit According to Fourth Embodiment>

FIG. 10 in which the same reference numerals are applied to the same configurations as those of FIG. 6 is a block diagram illustrating the configuration of the arithmetic processing unit 41 of the fourth embodiment. Note that, in the following description, the description of the configurations to which the same reference numerals as those of the first embodiment is repeated, and thus, the description thereof will be omitted.

The arithmetic processing unit 41 of the fourth embodiment includes the moving direction acquisition unit 18, and acquires the information indicating the moving direction of the target P to be measured from the outside by the moving direction acquisition unit 18. Note that, here, a case where the moving direction of the target P to be measured is acquired by the moving direction acquisition unit 18, as the information indicating the moving direction, will be described, but the invention is not limited thereto, and the moving direction angle α that specifies the moving direction in which the target P to be measured is moved may be acquired by the moving direction acquisition unit 18, as the information indicating the moving direction of the target P to be measured.

In this case, the moving direction acquisition unit may acquire the information indicating the moving direction of the target P to be measured from an external sensor, may acquire the information indicating the moving direction as a constant number in a case where the moving direction of the target P to be measured is constant, or may only store in advance the constant number. The moving direction acquisition unit 18 transmits the information indicating the moving direction of the target P to be measured to the measurement value calculation unit 26.

The arithmetic processing unit 41 of the fourth embodiment includes the separation displacement acquisition unit 35, and acquires the information indicating the separation displacement d of the target P to be measured from the outside by the separation displacement acquisition unit 35. In this case, the separation displacement acquisition unit 35 may acquire the separation displacement d by an external sensor such as a rangefinder, may acquire the separation displacement d as a constant number in a case where the separation displacement d is constant, or may only store in advance the constant number. The separation displacement acquisition unit 35 transmits the information indicating the separation displacement d to the measurement value calculation unit 26 of a calculation unit 43.

In the fourth embodiment, in Expression (1) described above, the i-th optical axis angle $\theta_i$, the i-th projection angle $\Phi_i$, the constant number k, and the wavelength $\lambda$ are a fixed value, and the moving direction angle $\alpha$ and the separation displacement d are also known, and thus, in a case where there is at least one i-th measuring head $\mathbf{5}_i$, the moving velocity V of the target P to be measured, which is unknown, can be obtained from Expression (1) described above.

In a case where the target P to be measured is moved while remaining the reference position, the separation displacement d can be defined as zero, and thus, the first term on the right side ($k(d/\cos \theta_i)$) in Expression (1) described above is not necessary.

For this reason, in this case, in the arithmetic processing unit 41 illustrated in FIG. 10, the constant number acquisition unit 16 acquiring the constant number k and the separation displacement acquisition unit 35 acquiring the separation displacement d are not necessary. Accordingly, in the measuring apparatus of the fourth embodiment, at least one i-th measuring head $\mathbf{5}_i$ is provided, and thus, the moving velocity V of the target P to be measured, which is unknown, can be obtained from Expression (4) described below.

(Expression 4)

$$\Delta f_1 = 2V(\cos \alpha \cos \Phi_1 \sin \theta_1 + \sin \alpha \sin \Phi_1 \sin \theta_1)/\lambda \quad (4)$$

Even in a case where there is one i-th measuring head $\mathbf{5}_i$, the moving velocity V can be calculated from Expression (5) described below in a case where the separation displacement d is defined as zero, and the i-th projection angle $\Phi_i$ of the i-th measuring head $\mathbf{5}_i$ is set to be coincident with the moving direction angle $\alpha$.

(Expression 5)

$$\Delta f_1 = 2V \sin \theta_1/\lambda \quad (5)$$

In the fourth embodiment, as with the first embodiment or the like described above, in a case where there are two or more i-th measuring heads $\mathbf{5}_i$, the moving velocity V of the target P to be measured can be calculated for each one i-th measuring head $\mathbf{5}_i$ of two or more i-th measuring heads $\mathbf{5}_i$, and thus, a plurality of moving velocities V are subjected to statistic processing (for example, the calculation of an average value), and therefore, it is possible to measure the moving velocity V with a high accuracy.

As described above, the measurement value calculation unit 26 in the fourth embodiment acquires the i-th optical axis angle $\theta_i$, the i-th projection angle $\Phi_i$, the constant number k, the wavelength $\lambda$, the separation displacement d, and the moving direction angle $\alpha$ in Expression (1) described above, and acquires at least one i-th frequency difference $\Delta f_i$ from the frequency difference calculation unit 22, and thus, is capable of calculating the moving velocity V of the target P to be measured on the basis of Expression (1) described above.

(4-2) <Operation and Effect>

As described above, in the measuring apparatus of the fourth embodiment, the relative moving velocity V of the target P to be measured can be measured in consideration of the influence of a Doppler shift that occurs due to the movement of the target P to be measured in the direction orthogonal to the displacement measurement direction, and thus, even in a case where the target P to be measured is moved in the direction orthogonal to the displacement measurement direction, it is possible to accurately measure the relative moving velocity V of the target P to be measured.

(5) <Fifth Embodiment>

Next, a fifth embodiment of the invention will be described in detail. A measuring apparatus of the fifth embodiment is capable of measuring the separation displacement d of the target P to be measured only with at least one i-th measuring head $\mathbf{5}_i$ by setting the relative moving velocity V of the target P to be measured and the moving direction angle $\alpha$ that is the information indicating the moving direction of the target P to be measured as known.

Figure 11:
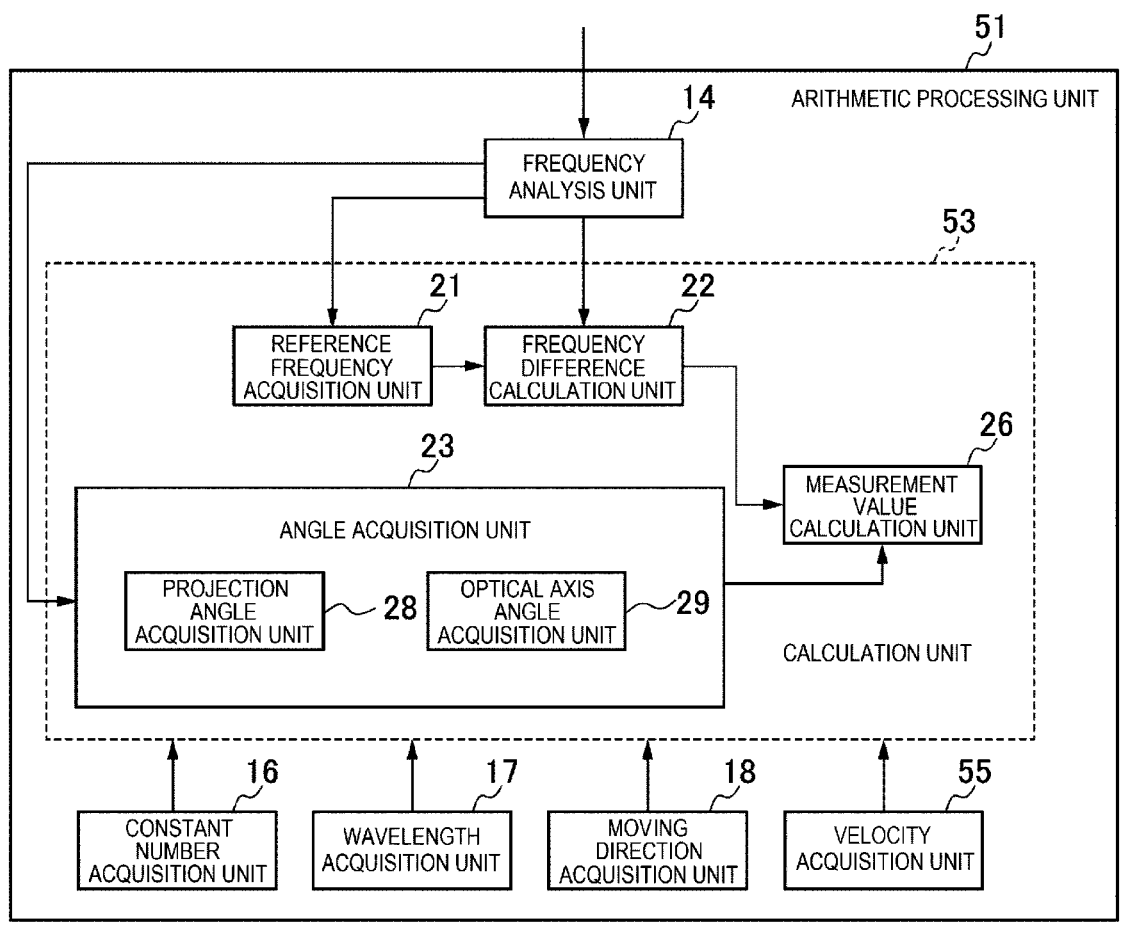
FIG. 11 is a block diagram illustrating a circuit configuration of an arithmetic processing unit according to a fifth embodiment, which is capable of measuring a separation displacement.

As illustrated in FIG. 11, the measuring apparatus of the fifth embodiment is different from that of the first embodiment described above in that the moving direction acquisition unit 18 and a velocity acquisition unit 55 are added to an arithmetic processing unit 51. Here, the fifth embodiment will be described below by focusing on the difference from the first embodiment, and the description of the same configuration as that of the first embodiment, such as the i-th measuring head $\mathbf{5}_i$, will be omitted.

(5-1) <Arithmetic Processing Unit According to Fifth Embodiment>

FIG. 11 in which the same reference numerals are applied to the same configurations as those of FIG. 6 is a block diagram illustrating the configuration of the arithmetic processing unit 51 of the fifth embodiment. Note that, in the following description, the description of the configurations to which the same reference numerals as those of the first embodiment is repeated, and thus, the description thereof will be omitted.

The arithmetic processing unit 51 of the fifth embodiment includes the moving direction acquisition unit 18, and acquires the information indicating the moving direction of the target P to be measured from the outside by the moving direction acquisition unit 18. Note that, here, a case where the moving direction of the target P to be measured is acquired by the moving direction acquisition unit 18, as the information indicating the moving direction, will be described, but the invention is not limited thereto, and the moving direction angle $\alpha$ that specifies the moving direction in which the target P to be measured is moved may be acquired by the moving direction acquisition unit 18, as the information indicating the moving direction of the target P to be measured.

In this case, the moving direction acquisition unit may acquire the information indicating the moving direction of the target P to be measured from an external sensor, may acquire the information indicating the moving direction as a constant number in a case where the moving direction of the target P to be measured is constant, or may only store in advance the constant number. The moving direction acquisition unit 18 transmits the information indicating the moving direction of the target P to be measured to the measurement value calculation unit 26.

The arithmetic processing unit 51 of the fifth embodiment includes the velocity acquisition unit 55, and acquires the moving velocity V of the target P to be measured from the outside by the velocity acquisition unit 55. In this case, the velocity acquisition unit 55 may acquire the moving velocity V by an external sensor such as a velocity meter, may acquire the moving velocity V of the target P to be measured as a constant number in a case where the moving velocity V of the target P to be measured is constant, or may only store in advance the constant number. The velocity acquisition unit 55 transmits the moving velocity V of the target P to be measured to the measurement value calculation unit 26 of a calculation unit 53.

In the fifth embodiment, in Expression (1) described above, the i-th optical axis angle $\theta_i$, the i-th projection angle $\Phi_i$, the constant number k, and the wavelength $\lambda$ are a fixed value, and the moving direction angle $\alpha$ and the moving velocity V are also known, and thus, in a case where there is at least one i-th measuring head $5_i$, the separation displacement d of the target P to be measured, which is unknown, can be obtained from Expression (1) described above.

In the fifth embodiment, as with the first embodiment or the like described above, in a case where there are two or more i-th measuring heads $5_i$, the separation displacement d of the target P to be measured can be calculated for each of the i-th measuring heads $5_i$, and thus, a plurality of separation displacements d are subjected to statistic processing (for example, the calculation of an average value), and therefore, it is possible to measure the separation displacement d with a high accuracy.

The measurement value calculation unit 26 in the fifth embodiment acquires the i-th optical axis angle $\theta_i$, the i-th projection angle $\Phi_i$, the constant number k, the wavelength $\lambda$, the moving velocity V, and the moving direction angle $\alpha$ in Expression (1) described above, and acquires at least one i-th frequency difference $\Delta f_i$ from the frequency difference calculation unit 22, and thus, is capable of calculating the separation displacement d of the target P to be measured on the basis of Expression (1) described above.

(5-2) <Operation and Effect>

As described above, in the measuring apparatus of the fifth embodiment, the separation displacement d of the target P to be measured can be measured in consideration of the influence of a Doppler shift that occurs due to the movement of the target P to be measured in the direction orthogonal to the displacement measurement direction, and thus, even in a case where the target P to be measured is moved in the direction orthogonal to the displacement measurement direction, it is possible to accurately measure the separation displacement d of the target P to be measured.

(6) <Sixth Embodiment>

(6-1) Target to be Measured in Sixth Embodiment

Next, a sixth embodiment of the invention will be described in detail. A measuring apparatus of the sixth embodiment is different from the measuring apparatus 1 illustrated in FIG. 1 in the first embodiment described above in that the arithmetic processing unit is different, and the other configuration thereof is the same as that of the measuring apparatus 1 illustrated in FIG. 1, and thus, the description thereof will be omitted.

Figure 12:
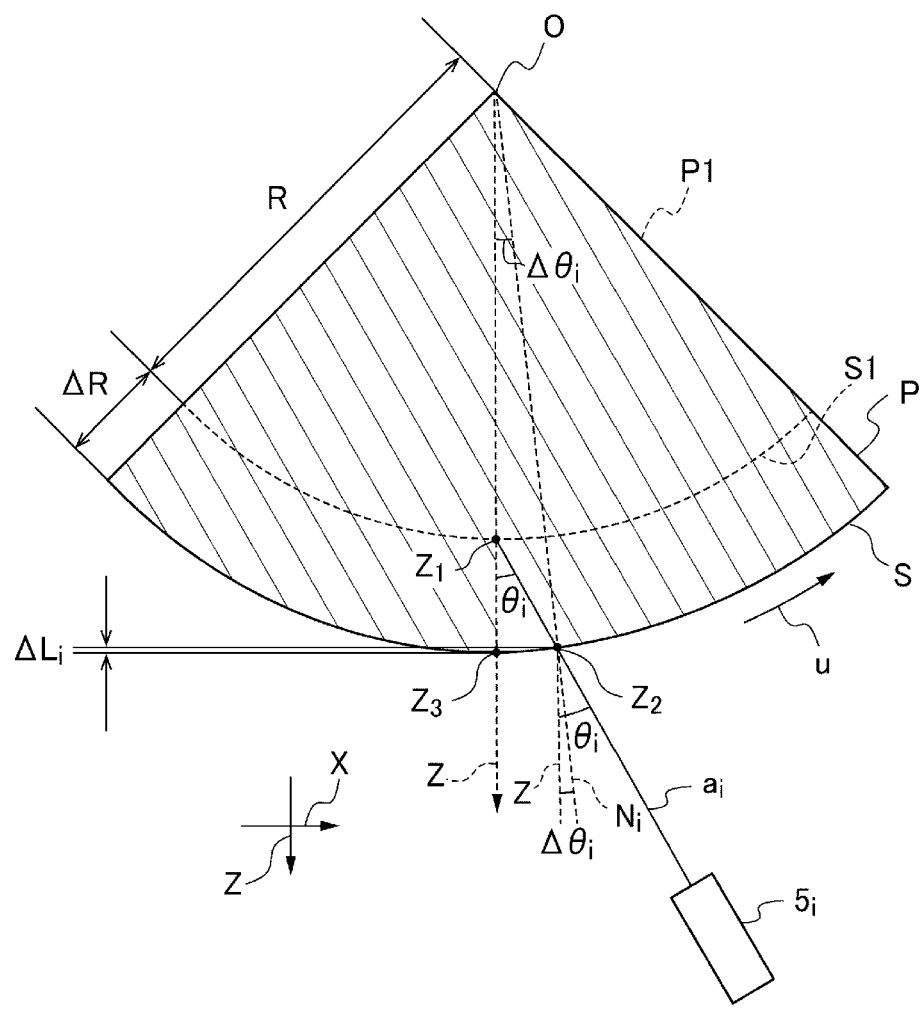
FIG. 12 is a schematic view for describing a relationship in an i-th optical axis angle $\theta_i$, a separation displacement $\Delta R$, $\Delta L_i$, and $\Delta \theta_i$ at the time of irradiating a target to be measured that is rotated with i-th measurement light.

A target to be measured of the sixth embodiment is different from that of the first embodiment to the fifth embodiment described above, and as illustrated in FIG. 12, a rotating body having a curved surface S is the target P to be measured. The target P to be measured having the curved surface S, for example, may be various rotating bodies such as a cylindrical rotating body in addition to a columnar rotating body. Note that, FIG. 12 illustrates only a sectional portion of a part of the rotating body, as the target P to be measured. In the sixth embodiment, an example is described in which the target P to be measured is rotated around a rotation axis O in a counterclockwise rotation direction (a u direction).

In the sixth embodiment, the velocity of the curved surface S when the target P to be measured that is a rotating body is rotated around the rotation axis O is set to the moving velocity V, and a change amount from the reference position (a reference diameter), indicating the degree of spatial separation of the curved surface S that is rotatively moved from the reference position (from another point of view, a diameter change of the target P to be measured), is set to a separation displacement $\Delta R$.

In the measuring apparatus of the sixth embodiment, at least one of the moving velocity V and the separation displacement $\Delta R$ is unknown, and the moving velocity V or the separation displacement $\Delta R$, which is unknown information, is measured.

In FIG. 12, P represented by a solid line indicates the target to be measured that is rotated around the rotation axis O, in which a rotation velocity of the curved surface S that is rotatively moved is measured as the moving velocity V. On the other hand, P1 represented by a broken line indicates a target to be measured that is a reference (hereinafter, referred to as a reference rotating body) and has a curved surface S1 and a predetermined diameter (hereinafter, referred to as a reference diameter R), and is a reference at the time of measuring the moving velocity V of the curved surface S of the target P to be measured in a predetermined position.

In the example of FIG. 12, an example is illustrated in which the radius of the target P to be measured is greater than the reference diameter R of the target P1 to be measured that is a reference by the separation displacement $\Delta R$. In addition, here, the central axis of the target P1 to be measured that is a reference is also coincident with the rotation axis O.

(6-2) <Configuration of i-Th Measuring Head in Sixth Embodiment>

In the sixth embodiment, as with the first embodiment described above, one or N i-th measuring heads $5_i$ are provided. Here, the inclination angle of the optical axis $a_i$ of the i-th measuring head $5_i$ will be described below by focusing on one i-th measuring head $5_i$ of one or N i-th measuring heads $5_i$.

FIG. 12 illustrates a configuration when the i-th measuring head $5_i$ is seen from a rotation-axis direction of the rotation axis O of the target P to be measured, and illustrates only one i-th measuring head $5_i$. In a case where N i-th measuring heads $5_i$ are provided, a plurality of i-th measuring heads $5_i$ are provided by changing the position to be disposed, but in FIG. 12, only one i-th measuring head $5_i$ of N i-th measuring heads $5_i$ is representatively illustrated, and the other i-th measuring heads $5_i$ are not illustrated.

In the sixth embodiment, when the i-th measuring head $5_i$ irradiates the curved surface S1 of the target P1 to be measured having the reference diameter R with laser light (the i-th measurement light), an irradiation reference position $Z_1$ of the laser light on the curved surface S1 is designated as a starting point, and a direction orthogonal to the rotation axis O (a normal direction of the curved surface S1 in the irradiation reference position $Z_1$) is set to the Z-axis direction. Here, an angle between the optical axis $a_i$ of the i-th measuring head $5_i$ (hereinafter, also referred to as an i-th optical axis) and the Z-axis direction is referred to as the i-th optical axis angle $\theta_i$.

Figure 13:
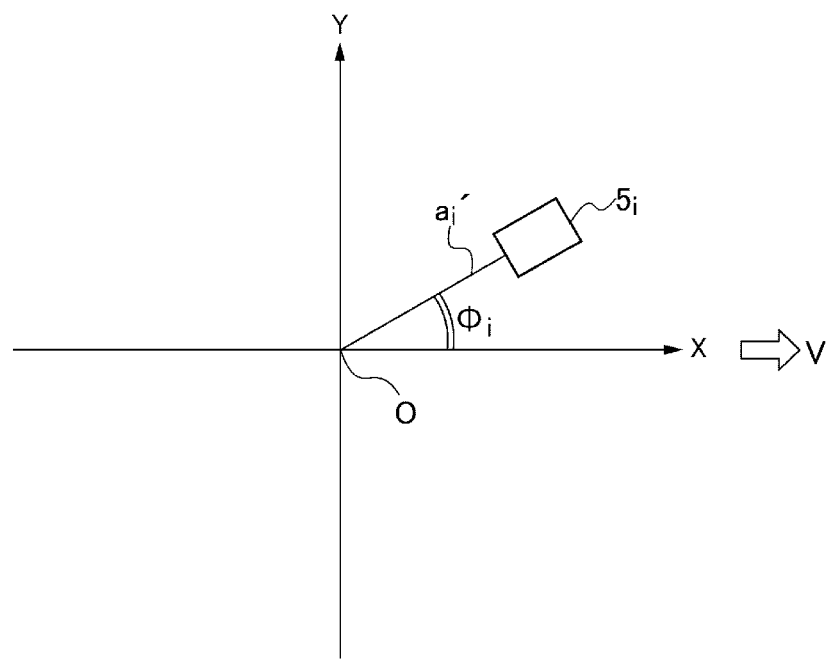
FIG. 13 is a schematic view for describing the i-th projection angle $\Phi_i$ in the target to be measured.

FIG. 13 is a schematic view when the i-th measuring head $5_i$ is seen from the Z-axis direction. In FIG. 13, the Y-axis direction indicates a direction parallel to the rotation axis at the irradiation reference position $Z_1$ of the laser light. The X-axis direction indicates a direction orthogonal to the Z-axis direction and the Y-axis direction at the irradiation reference position $Z_1$ of the laser light, and indicates the moving direction (a rotation direction) in the irradiation reference position $Z_1$.

As illustrated in FIG. 13, an angle formed by the projection $a_i'$ obtained by projecting the optical axis $a_i$ of the i-th measuring head $5_i$ with respect to the curved surface S1 of the target P1 to be measured and the X-axis direction on a tangent plane (the XY plane) of the target P1 to be measured at the irradiation reference position $Z_1$ of the laser light is referred to as the i-th projection angle $\Phi_i$.

As described above, the inclination angle of the optical axis $a_i$ of the i-th measuring head $5_i$ can be defined by the i-th optical axis angle $\theta_i$ and the i-th projection angle $\Phi_i$.

In a case where N i-th measuring heads $5_i$ are provided, the i-th optical axis angle $\theta_i$ of each of the i-th measuring heads $5_i$ may be the same i-th optical axis angle $\theta_i$ for each of the i-th measuring heads $5_i$, or may be different i-th optical axis angles $\theta_i$. In addition, in a case where N i-th measuring heads $5_i$ are provided, the i-th projection angle $\Phi_i$ of each of the i-th measuring heads $5_i$ may be the same i-th projection angle $\Phi_i$ for each of the i-th measuring heads $5_i$, or may be different i-th projection angles $\Phi_i$.

Here, in a case where N i-th measuring heads $5_i$ are provided, it is desirable that each of the i-th measuring heads $5_i$ is disposed in different positions, and thus, when the same i-th projection angle $\Phi_i$ is set in the plurality of i-th measuring heads $5_i$, it is desirable to set different i-th optical axis angles $\theta_i$, and when the same i-th optical axis angle $\theta_i$ is set in the plurality of i-th measuring heads $5_i$, it is desirable to set different i-th projection angles $\Phi_i$.

In the first embodiment described above, an example when three i-th measuring heads $5_i$ (the first measuring head $5_1$, the second measuring head $5_2$, and the third measuring head $5_3$ (i=1, 2, 3)) are provided is illustrated in FIG. 5, and a disposition configuration of the i-th measuring head $5_i$ illustrated in FIG. 5 is the same in the sixth embodiment.

Here, in the sixth embodiment, in order to simplify the description, it will be described below that the i-th projection angle $\Phi_i$ described above is zero, that is, the optical axis $a_i$ of the i-th measuring head $5_i$ is orthogonal to the Y-axis direction that is the rotation-axis direction. Note that, in a case where N i-th measuring heads $5_i$ are provided, it will be described below that the optical axis $a_i$ of each of the i-th measuring heads $5_i$ is in the same plane.

(6-3) <Outline of Measuring Method of Sixth Embodiment>

Next, in sixth embodiment, a measuring method of the moving velocity V and the separation displacement d of the target P to be measured having the curved surface S will be described. For example, the i-th beat frequency is obtained from the i-th reflection light that is reflected from the curved surface S1 of the target P1 to be measured in the reference state (for example, a state in which the target P1 to be measured has the reference diameter R and remains still) and the i-th reference light from the laser oscillator 2, and is set to the i-th reference frequency.

The i-th beat frequency is obtained from the i-th reflection light reflected from the curved surface S of the target P to be measured that has a diameter (R+ΔR) different from the reference diameter R and is rotated and the i-th reference light from the laser oscillator 2.

In a case where a difference between the i-th reference frequency and the i-th beat frequency (hereinafter, referred to as the i-th frequency difference) is set to $\Delta f_i$, the i-th frequency difference $\Delta f_i$ is affected by the change of the irradiation reference position $Z_1$ of the laser light (the i-th measurement light) to an irradiation position $Z_2$ by the separation displacement ΔR and by a Doppler shift that occurs due to the movement of the curved surface S according to a rotation, and can be represented by Expression (6) described below.

(Expression 6)

$$\Delta f_i = k(\Delta R - \Delta L_i)/\cos\theta_i + (2V\sin(\theta_i - \Delta\theta_i))/\lambda \qquad (6)$$

λ represents the wavelength of the laser light. k, for example, is a constant number indicating the relationship of the degree of change of the frequency of the laser light in a case where the diameter of the target P to be measured is changed with respect to the reference diameter R. As illustrated in FIG. 12, $\Delta L_i$ and $\Delta\theta_i$ are a geometric value that is generated by a diameter change, and may be obtained by R, ΔR, and $\theta_i$. Note that, $Z_3$ is a point on the curved surface S in the Z-axis direction, and $\Delta L_i$ indicates a distance between $Z_2$ and $Z_3$ in the Z-axis direction. $N_i$ represents a direction from the rotation axis O through $Z_2$, and $\Delta\theta_i$ indicates an angle between the Z-axis direction and an $N_i$ direction.

In the calculation of i-th frequency difference $\Delta f_i$, it is not necessary to use the i-th reference frequency detected when the target P1 to be measured that is a reference relatively remains still. For example, the i-th beat frequency detected the target P1 to be measured that is a reference is moved at the reference velocity may be set to the i-th reference frequency, and the i-th frequency difference $\Delta f_i$ may be calculated from a difference between the i-th beat frequency detected when the target P to be measured that is a measurement target is rotated at a velocity other than the reference velocity and the i-th reference frequency.

In Expression (6) described above, the reference diameter R, the i-th optical axis angle $\theta_i$, the constant number k, and the wavelength λ are a fixed value, and thus, for example, in a case where there are at least two i-th measuring heads $5_i$, a first frequency difference $\Delta f_1$ and a second frequency difference $\Delta f_2$ can be measured as the i-th frequency difference $\Delta f_i$, and therefore, the separation displacement ΔR and the moving velocity V, which are unknown, can be obtained on the basis of Expression (6) described above.

Here, the reference diameter R, the i-th optical axis angle $\theta_i$, the constant number k, and the wavelength $\lambda$ are a fixed value, and thus, for example, in a case where there are at least three or more i-th measuring heads $5_i$, two separation displacements $\Delta R$ and two moving velocities V can be respectively obtained by a combination of two i-th measuring heads $5_i$ arbitrarily selected from three or more i-th measuring heads $5_i$. The separation displacements $\Delta R$ and the moving velocities V respectively obtained by the combination of two i-th measuring heads $5_i$ that are arbitrarily selected are subjected to statistic processing (for example, the calculation of an average value), and thus, measurement can be performed with a higher accuracy.

When the same calculation is performed even in a case where the i-th projection angle $\Phi_i$ is not zero, it is possible to obtain the separation displacement $\Delta R$ and the moving velocity V. By increasing the i-th measuring head $5_i$, it is also possible to obtain the velocity of the target P to be measured in the rotation-axis direction (the Y-axis direction), which is not only rotated but also moved in the axis direction.

Here, a case where the diameter of the target P1 to be measured that is a reference is different from the diameter of the target P to be measured that is a measurement target has been described, and a case where the diameters are the same, but the target P to be measured itself is moved in the Z-axis direction can be measured as the separation displacement $\Delta R$.

(6-4) <Arithmetic Processing Unit in Sixth Embodiment>

Next, an arithmetic processing unit executing the measuring method described above will be described below. The configuration of an arithmetic processing unit of the sixth embodiment is identical to that of the arithmetic processing unit of the first embodiment except that the constant number acquisition unit 16 also acquires information relevant to the reference diameter R. Note that, the arithmetic processing unit of the sixth embodiment has the same circuit configuration as that illustrated in FIG. 6, and thus, here, the description will be given by using FIG. 6. The constant number acquisition unit 16 in the sixth embodiment may acquire the information indicating the reference diameter R of the target P to be measured from an external sensor that is capable of measuring a radius, may acquire the information indicating the reference diameter R of the target P to be measured as a constant number, or may only store in advance the constant number. The constant number acquisition unit 16 transmits the information indicating the reference diameter R of the target P to be measured to the measurement value calculation unit 26.

Accordingly, in the arithmetic processing unit 11 of the sixth embodiment, the reference diameter R, the i-th optical axis angle $\theta_i$, the constant number k, and the wavelength $\lambda$ are a fixed value, and thus, for example, the i-th frequency difference $\Delta f_i$ is acquired, and the moving velocity V and the separation displacement $\Delta R$ of the target P to be measured can be calculated on the basis of Expression (6) described above, considering the influence of a Doppler shift that occurs due to the movement of the target P to be measured in the direction orthogonal to the displacement measurement direction, by the measurement value calculation unit 26.

In a case where there are three or more i-th measuring heads $5_i$, the measurement value calculation unit 26 calculates the moving velocity V of the target P to be measured and the separation displacement $\Delta R$ of the target P to be measured for each combination of two i-th measuring heads $5_i$ of three or more i-th measuring heads $5_i$, and is capable of performing statistic processing (for example, the calculation of an average value) with respect to the moving velocity V and the separation displacement $\Delta R$. Accordingly, in the sixth embodiment, it is possible to measure the moving velocity V and the separation displacement $\Delta R$ with a high accuracy.

(6-5) <Operation and Effect>

As described above, in the measuring apparatus of the sixth embodiment, the relative moving velocity V of the target P to be measured and the separation displacement $\Delta R$ of the target P to be measured can be measured in consideration of the influence of a Doppler shift that occurs due to the movement of the curved surface S in a circumference direction according to the rotation of the target P to be measured around the rotation axis O, and thus, even in a case where the target P to be measured is rotatively moved in the circumference direction, it is possible to accurately measure the relative moving velocity V of the target P to be measured and the separation displacement $\Delta R$ of the target P to be measured.

(7) <Seventh Embodiment>

Next, a seventh embodiment of the invention will be described in detail. As with the sixth embodiment described above, a measuring apparatus of the seventh embodiment acquires the separation displacement $\Delta R$ of the target P to be measured with respect to the target P to be measured that has the curved surface S as illustrated in FIG. 12 and is rotated, and thus, is capable of measuring the relative moving velocity V of the curved surface S when the target P to be measured is rotated only with at least one i-th measuring head $5_i$.

The measuring apparatus of the seventh embodiment is different from that of the sixth embodiment described above in that the separation displacement acquisition unit 35 is added to the arithmetic processing unit. Here, the seventh embodiment will be described below by focusing on the difference from the sixth embodiment, and the description of the same configuration as that of the first embodiment, such as the i-th measuring head $5_i$, will be omitted.

(7-1) <Arithmetic Processing Unit According to Seventh Embodiment>

Next, the arithmetic processing unit executing the measuring method described above will be described below. The configuration of the arithmetic processing unit of the seventh embodiment is different from that of the arithmetic processing unit of the sixth embodiment in that the separation displacement acquisition unit 35 is provided as with the arithmetic processing unit 33 of the third embodiment. Note that, the arithmetic processing unit of the seventh embodiment has the same circuit configuration as that illustrated in FIG. 9, and thus, here, the description will be given by using FIG. 9. The arithmetic processing unit 33 of the seventh embodiment acquires information indicating the separation displacement $\Delta R$ of the target P to be measured from the reference diameter R from the outside by the separation displacement acquisition unit 35 (the diameter of the target to be measured may be acquired, and the separation displacement $\Delta R$ may be obtained from a difference between the diameter and the reference diameter R). In this case, the separation displacement acquisition unit 35 may acquire the separation displacement ΔR by an external sensor such as a rangefinder, may acquire the separation displacement ΔR as a constant number in a case where the separation displacement ΔR is constant, or may only store in advance the constant number. The separation displacement acquisition unit 35 transmits the information indicating the separation displacement ΔR to the measurement value calculation unit 26 of the calculation unit 34.

In the seventh embodiment, in Expression (6) described above, the reference diameter R, the i-th optical axis angle $\theta_i$, the constant number k, and the wavelength λ are a fixed value, and the separation displacement ΔR is also known, and thus, in a case where there is at least one i-th measuring head $5_i$, the moving velocity V of the target P to be measured, which is unknown, can be obtained by Expression (6) described above.

In a case where the target P to be measured is rotated while remaining the reference diameter, the separation displacement ΔR can be defined as zero, and thus, $\Delta L_i$ and $\Delta\theta_i$ are also zero, and the first term on the right side (k(ΔR−$\Delta L_i$)/cos $\theta_i$) in Expression (6) described above is not also necessary.

For this reason, in the arithmetic processing unit 33 of the seventh embodiment, it is not necessary for the constant number acquisition unit 16 to acquire the constant number k. Accordingly, in the measuring apparatus of the seventh embodiment, at least one i-th measuring head $5_i$ is provided, and thus, it is possible to obtain the moving velocity V of the target P to be measured, which is unknown, from Expression (7) described below.

(Expression 7)

$$\Delta f_i = (2V \sin \theta_i)/\lambda \tag{7}$$

In the seventh embodiment, as with the sixth embodiment or the like described above, in a case where there are two or more i-th measuring heads $5_i$, the moving velocity V of the target P to be measured can be calculated for each one i-th measuring head $5_i$ of two or more i-th measuring heads $5_i$, and thus, a plurality of moving velocities V are subjected to statistic processing (for example, the calculation of an average value), and therefore, it is possible to measure the moving velocity V with a high accuracy.

As described above, the measurement value calculation unit 26 in the seventh embodiment acquires the reference diameter R, the i-th optical axis angle $\theta_i$, the constant number k, the wavelength λ, and the separation displacement ΔR in Expression (6) described above, and acquires the at least one i-th frequency difference $\Delta f_i$ from the frequency difference calculation unit 22, and thus, is capable of calculating the moving velocity V of the target P to be measured on the basis of Expression (6) described above.

(7-2) <Operation and Effect>

As described above, in the measuring apparatus of the seventh embodiment, the relative moving velocity V of the target P to be measured can be measured in consideration of the influence of a Doppler shift that occurs due to the rotation of the target P to be measured in the circumference direction, and thus, even in a case where the diameter of the target P to be measured is changed, it is possible to accurately measure the relative moving velocity V of the target P to be measured.

(8) <Eighth Embodiment>

Next, an eighth embodiment of the invention will be described in detail. A measuring apparatus of the eighth embodiment acquires information indicating the relative moving velocity V of the curved surface S of the target P to be measured that is rotated, and thus, is capable of measuring the separation displacement ΔR of the target P to be measured from the reference diameter R only with at least one i-th measuring head $5_i$.

The measuring apparatus of the eighth embodiment is different from that of the sixth embodiment described above in that the velocity acquisition unit 55 is added to the arithmetic processing unit 11 illustrated in FIG. 6. Here, the eighth embodiment will be described below by focusing on the difference from the sixth embodiment, and the description of the same configuration as that of the sixth embodiment, such as the i-th measuring head $5_i$, will be omitted.

(8-1) <Arithmetic Processing Unit According to Eighth Embodiment>

Next, an arithmetic processing unit executing the measuring method described above will be described below. The configuration of the arithmetic processing unit of the eighth embodiment is different from that of the arithmetic processing unit 11 of the sixth embodiment in that the velocity acquisition unit 55 is provided. Note that, in the following description, the description of the configurations to which the same reference numerals as those of the sixth embodiment is repeated, and thus, the description thereof will be omitted.

The arithmetic processing unit of the eighth embodiment includes the velocity acquisition unit 55, and acquires the information indicating the moving velocity V of the curved surface S when the target P to be measured is rotated from the outside by the velocity acquisition unit 55. Note that, the velocity acquisition unit 55 of the eighth embodiment acquires the moving velocity V of the curved surface S when the target P to be measured is rotated or an angular velocity ω, as the information indicating the moving velocity V.

In this case, the velocity acquisition unit 55 may acquire the information indicating the moving velocity V of the target P to be measured by an external sensor such as a velocity meter, may acquire the information indicating the moving velocity V as a constant number in a case where the moving velocity V or the angular velocity co of the target P to be measured is constant, or may only store in advance the constant number. The velocity acquisition unit 55 transmits the information indicating the moving velocity V of the target P to be measured to the measurement value calculation unit 26.

In the eighth embodiment, in Expression (6) described above, the reference diameter R, the i-th optical axis angle $\theta_i$, the constant number k, and the wavelength λ are a fixed value, and the moving velocity V is also known, and thus, in a case where there is at least one i-th measuring head $5_i$, the separation displacement ΔR of the target P to be measured, which is unknown, can be obtained by Expression (6) described above.

In the eighth embodiment, as with the sixth embodiment or the like described above, in a case where there are two or more i-th measuring heads $5_i$, the separation displacement ΔR of the target P to be measured can be calculated for each one i-th measuring head $5_i$ of two or more i-th measuring heads $5_i$, and thus, a plurality of separation displacements ΔR are subjected to statistic processing (for example, the calculation of an average value), and therefore, it is possible to measure the separation displacement ΔR with a high accuracy.

As described above, the measurement value calculation unit 26 in the eighth embodiment acquires the reference diameter R, the i-th optical axis angle $\theta_i$, the constant number k, the wavelength $\lambda$, and the moving velocity V in Expression (6) described above, and acquires at least one i-th frequency difference $\Delta f_i$ from the frequency difference calculation unit 22, and thus, is capable of calculating the separation displacement $\Delta R$ of the target P to be measured on the basis of Expression (6) described above.

(8-2) <Operation and Effect>

As described above, the measuring apparatus of the eighth embodiment is capable of measuring the separation displacement $\Delta R$ of the target P to be measured in consideration of the influence of a Doppler shift that occurs due to the rotation of the target P to be measured, and thus, even in a case where the target P to be measured is rotated, it is possible to accurately measure the separation displacement $\Delta R$ of the target P to be measured.

(9) <Calibration of i-Th Optical Axis Angle and i-Th Projection Angle According to Arithmetic Processing>

The optical axis angle and the projection angle may be directly measured, but it is difficult to accurately perform the measurement. Therefore, a case where the i-th optical axis angle $\theta_i$ and the i-th projection angle $\Phi_i$ are calculated by arithmetic processing in the angle acquisition unit 23 of the first embodiment to the eighth embodiment will be described below.

Figure 14:
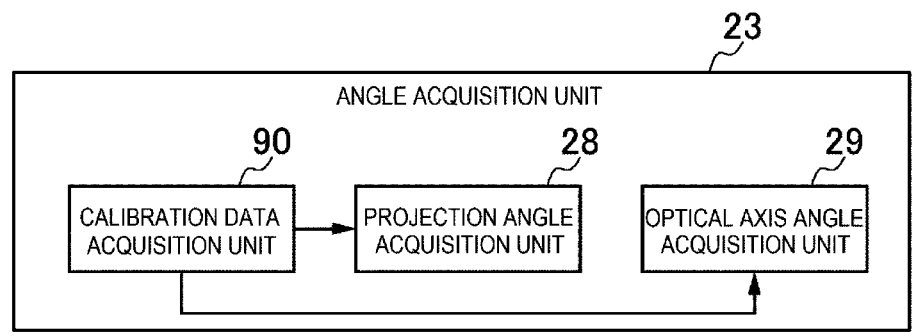
FIG. 14 is a block diagram illustrating configuration of an angle acquisition unit according to another embodiment.

FIG. 14 is a block diagram illustrating a circuit configuration of the angle acquisition unit 23 calculating the i-th optical axis angle $\theta_i$ and the i-th projection angle $\Phi_i$ by the arithmetic processing, as the inclination angle. In this case, in the angle acquisition unit 23, a calibration data acquisition unit 90 is provided in addition to the projection angle acquisition unit 28 and the optical axis angle acquisition unit 29.

It is desirable that the i-th optical axis angle $\theta_i$ and the i-th projection angle $\Phi_i$, for example, are calculated by performing a test using the target P to be measured prior to the measurement of the moving velocity V, the separation displacement d (the separation displacement $\Delta R$), and the like of the target P to be measured that is a measurement target. Here, the first embodiment illustrated in FIG. 1 and FIG. 6 has been described as an example, but similarly, in the second embodiment to the eighth embodiment, the i-th optical axis angle $\theta_i$ and the i-th projection angle $\Phi_i$ can be calculated.

Figure 15:
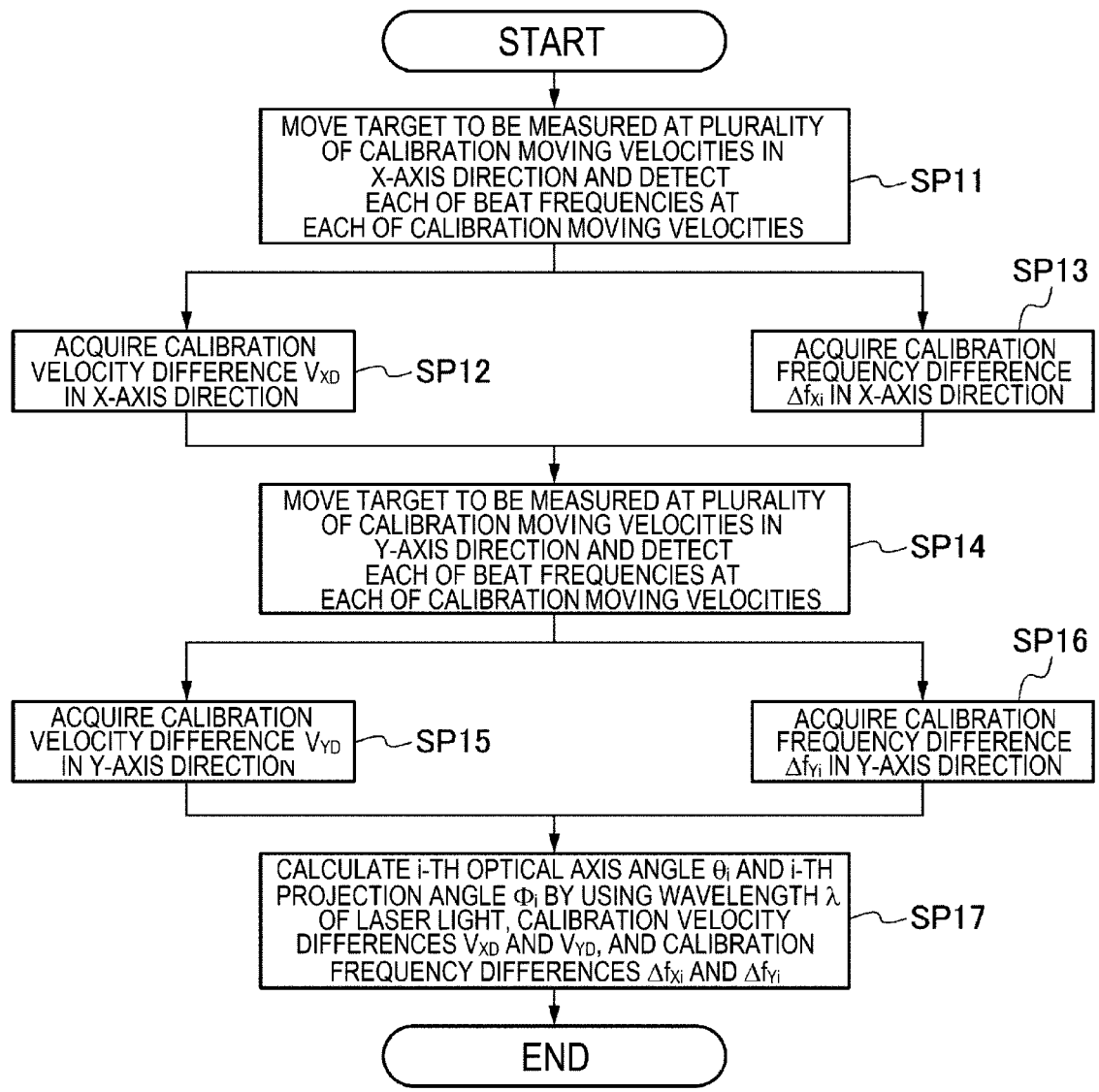
FIG. 15 is a flowchart illustrating a calculation processing procedure of the i-th optical axis angle $\theta_i$ and the i-th projection angle $\Phi_i$.

FIG. 15 is a flowchart illustrating a calculation processing procedure of the i-th optical axis angle $\theta_i$ and the i-th projection angle $\Phi_i$. Here, the calculation processing procedure of the optical axis angle and the projection angle will be described along with the flowchart illustrated in FIG. 15. First, the target P to be measured, for example, is moved at a plurality of calibration moving velocities $V_{X1}$ and $V_{X2}$ along the X-axis direction in the same position, each of the i-th beat frequencies at the calibration moving velocities $V_{X1}$ and $V_{X2}$ is detected (step SP11), and each of the i-th beat frequencies that is detected is transmitted to the frequency difference calculation unit 22 from the frequency analysis unit 14.

The frequency difference calculation unit 22 calculates a difference between the i-th beat frequencies at the calibration moving velocities $V_{X1}$ and $V_{X2}$ in the X-axis direction, as an i-th calibration frequency difference (hereinafter, also simply referred to as a calibration frequency difference) $\Delta f_{Xi}$ (step SP13), and transmits the difference to the projection angle acquisition unit 28 and the optical axis angle acquisition unit 29.

The calibration data acquisition unit 90 acquires information indicating the calibration moving velocities $V_{X1}$ and $V_{X2}$ in the X-axis direction, and acquires a calibration velocity difference $V_{XD}$ indicating a velocity difference between the calibration moving velocities $V_{X1}$ and $V_{X2}$ (step SP12). Note that, the calibration data acquisition unit 90 may acquire information indicating the calibration moving velocities $V_{X1}$ and $V_{X2}$ or the calibration velocity difference $V_{XD}$ by an external sensor such as a velocity meter, may acquire the information indicating the calibration moving velocities $V_{X1}$ and $V_{X2}$ or the calibration velocity difference $V_{XD}$, as a constant number, or may only store in advance the constant number. The calibration data acquisition unit 90 transmits the information indicating the calibration velocity difference $V_{XD}$ to the projection angle acquisition unit 28 and the optical axis angle acquisition unit 29.

Accordingly, the i-th calibration frequency difference $\Delta f_{Xi}$, the calibration velocity difference $V_{XD}$, and the wavelength $\lambda$ are used, and Moving direction angle $\alpha=0°$ is set, and thus, Expression (8) described below can be derived from the second term of Expression (1) described above.

(Expression 8)

$$\Delta f_{Xi} = (2V_{XD} \cos \Phi_i \sin \theta_i)/\lambda \qquad (8)$$

Next, the target P to be measured, for example, is moved at a plurality of calibration moving velocities $V_{Y1}$ and $V_{Y2}$ along the Y-axis direction orthogonal to the X-axis direction in the same position, each of the i-th beat frequencies at the calibration moving velocities $V_{Y1}$ and $V_{Y2}$ is detected (step SP14), and each of the i-th beat frequencies that is detected is transmitted to the frequency difference calculation unit 22 from the frequency analysis unit 14.

The frequency difference calculation unit 22 calculates a difference between the i-th beat frequencies at the calibration moving velocities $V_{Y1}$ and $V_{Y2}$ in the Y-axis direction, as an i-th calibration frequency difference (hereinafter, also simply referred to as a calibration frequency difference) $\Delta f_{Yi}$ (step SP16), and transmits the difference to the projection angle acquisition unit 28 and the optical axis angle acquisition unit 29.

The calibration data acquisition unit 90 acquires information indicating the calibration moving velocities $V_{Y1}$ and $V_{Y2}$ in the Y-axis direction, and acquires a calibration velocity difference $V_{YD}$ indicating a velocity difference between the calibration moving velocities $V_{Y1}$ and $V_{Y2}$ (step SP15). Note that, the calibration data acquisition unit 90 may acquire information indicating the calibration moving velocities $V_{Y1}$ and $V_{Y2}$ or the calibration velocity difference $V_{YD}$ by an external sensor such as a velocity meter, may acquire the information indicating the calibration moving velocities $V_{Y1}$ and $V_{Y2}$ or the calibration velocity difference $V_{YD}$, as a constant number, or may only store in advance the constant number. The calibration data acquisition unit 90 transmits the information indicating the calibration velocity difference $V_{YD}$ to the projection angle acquisition unit 28 and the optical axis angle acquisition unit 29.

Accordingly, the i-th calibration frequency difference $\Delta f_{Yi}$, the calibration velocity difference $V_{YD}$, and the wavelength $\lambda$ are used, and Moving direction angle $\alpha=90°$ is set, and thus, Expression (9) described below can be derived from the third term of Expression (1) described above.

(Expression 9)

$$\Delta f_{Yi}=(2V_{YD} \sin \Phi_i \sin \theta_i)/\lambda \tag{9}$$

The projection angle acquisition unit 28 acquires the i-th frequency difference $\Delta f_{Xi}$ and the calibration velocity difference $V_{XD}$ in the X-axis direction, acquires the i-th frequency difference $\Delta f_{Yi}$ and the calibration velocity difference $V_{YD}$ in the Y-axis direction, and acquires the wavelength $\lambda$ from the wavelength acquisition unit 17, and thus, is capable of calculating the i-th projection angle $\Phi_i$ on the basis of Expression (8) and Expression (9) described above (step SP17).

In the optical axis angle acquisition unit 29, the i-th frequency difference $\Delta f_{Xi}$ and the calibration velocity difference $V_{XD}$ in the X-axis direction are acquired, the i-th frequency difference $\Delta f_{Yi}$ and the calibration velocity difference $V_{YD}$ in the Y-axis direction are acquired, and the wavelength $\lambda$ is acquired from the wavelength acquisition unit 17, and thus, the i-th optical axis angle $\theta_i$ can be calculated on the basis of Expression (8) and Expression (9) described above (step SP17).

Accordingly, in the measuring apparatus 1, it is possible to accurately acquire the i-th optical axis angle $\theta_i$ and the i-th projection angle $\Phi_i$ of the i-th measuring head $5_i$ at the time of providing the i-th measuring head $5_i$, and to measure the moving velocity V, the separation displacement d, or the like with a higher accuracy. In addition, in the measuring apparatus 1, even in a case where it is difficult to directly measure the i-th optical axis angle $\theta_i$ and the i-th projection angle $\Phi_i$ of the i-th measurement light, it is possible to accurately obtain the i-th optical axis angle $\theta_i$ and the i-th projection angle $\Phi_i$.

In the embodiments described above, a case where both of the i-th optical axis angle $\theta_i$ and the i-th projection angle $\Phi_i$ are calculated by the angle acquisition unit 23 has been described, but the invention is not limited thereto, and any one of the i-th optical axis angle $\theta_i$ and the i-th projection angle $\Phi_i$ may be calculated by the angle acquisition unit 23.

For example, the i-th measuring head $5_i$ is disposed such that the i-th projection angle $\Phi_i$ is 0°, and thus, $(\Delta f_{Xi}=(2V_{XD} \sin \theta_i)/\lambda)$ and the i-th optical axis angle $\theta_i$ can be calculated on the basis of Expression (8) described above. In addition, the i-th measuring head $5_i$ is disposed such that the i-th projection angle $\Phi_i$ is 90°, and thus, $(\Delta f_{Yi}=(2V_{YD} \sin \theta_i)/\lambda)$ and the i-th optical axis angle $\theta_i$ can be calculated on the basis of Expression (9) described above.

Any one of the i-th optical axis angle $\theta_i$ and the i-th projection angle $\Phi_i$ may be acquired as a constant number, or may be stored in advance. Any one of the i-th optical axis angle $\theta_i$ and the i-th projection angle $\Phi_i$ is set to a constant number, and thus, the other one of the i-th optical axis angle $\theta_i$ and the i-th projection angle $\Phi_i$ can be calculated on the basis of Expression (8) described above or Expression (9).

In the ninth embodiment described above, the measuring method for measuring the inclination angle of the optical axis $a_i$ of the laser light (both or one of the i-th optical axis angle $\theta_i$ and the i-th projection angle $\Phi_i$) at the time of measuring at least any one of the velocity V and the separation displacement d of the target to be measured S has been described, but the invention is not limited thereto. For example, in the measuring method, only the inclination angle of the optical axis $a_i$ of the laser light (both or one of the i-th optical axis angle $\theta_i$ and the i-th projection angle $\Phi_i$) may be measured without measuring the velocity V and the separation displacement d of the target to be measured S.

(10) <i-Th Optical Axis Angle $\theta_i$>

Here, in the first embodiment to the eighth embodiment described above, in a case where the i-th optical axis angle $\theta_i$ is zero (that is, in a case where the optical axis $a_i$ of the i-th measuring head $5_i$ is set to be coincident with a surface normal direction of the target surface S to be measured or the curved surface S), it is difficult to measure the moving velocity V of the target P to be measured, and thus, it is necessary that the i-th optical axis angle $\theta_i$ is greater than zero.

On the other hand, as a frequency change rate with respect to the i-th optical axis angle $\theta_i$, in a case where the i-th optical axis angle $\theta_i$ is greater than 60°, a change in measurement resolution of the moving velocity V of the target P to be measured is approximately ½ of that at 0°, and thus, it is desirable that a maximum angle of the i-th optical axis angle $\theta_i$ is 60°. Accordingly, it is desirable that the i-th optical axis angle $\theta_i$ is set to 0°<$\theta_i$≤60°.

In a case where the i-th optical axis angle $\theta_i$ is large, the intensity of the i-th reflection light decreases, and it is difficult to measure the moving velocity V, the separation displacement d, or the like of the target P to be measured. From such a viewpoint, an upper limit of the i-th optical axis angle $\theta_i$ can be set in accordance with a distance measurement range, a measurement target, and surface properties, and for example, in a case where a mill scale steel plate is used as a target and a measurement range is approximately 50 mm, sufficient signal intensity at which stable measurement can be performed is obtained up to the i-th optical axis angle $\theta_i$ of 40°. Accordingly, it is more desirable that the range of the i-th optical axis angle $\theta_i$ is set to 0°<$\theta_i$≤40°. Here, in a case where it is possible to decrease the distance measurement range, it is also possible to increase the upper limit of the i-th optical axis angle $\theta_i$.

(11) <Other Embodiments>

In the first embodiment to the eighth embodiment described above, for example, it has been described that in a case where N i-th measuring heads $5_i$ are provided, the laser light applied from one laser oscillator 2 is split by the optical splitters 3b and 3c, and the i-th measurement light and the i-th reference light are generated for each of the i-th measuring heads $5_i$, but the invention is not limited thereto, the laser oscillator may be provided for each of the i-th measuring heads $5_i$.

In the first embodiment to the eighth embodiment described above, the FSF laser is applied as a laser oscillation unit oscillating laser light modulated with respect to time by a predetermined frequency change amount, but the invention is not limited thereto, and for example, various laser oscillation units such as wavelength variable semiconductor laser that is capable of modulating a frequency by an injection current may be applied insofar as it is possible to oscillating laser light of which the frequency is modulated with respect to time.

(12) <Example of Hardware Configuration of Arithmetic Processing Unit>

Figure 16:
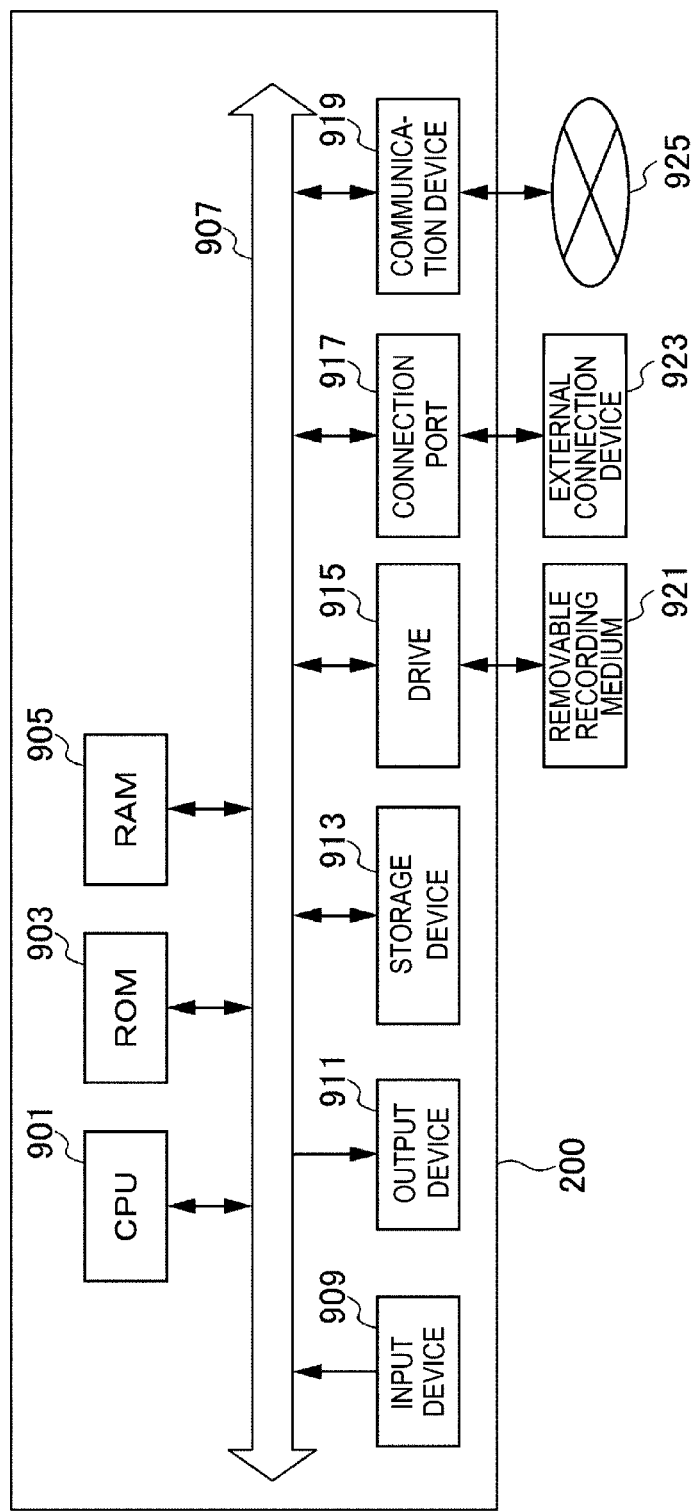
FIG. 16 is a block diagram illustrating an example of a hardware configuration of an arithmetic processing unit in each embodiment.
Figure 17:
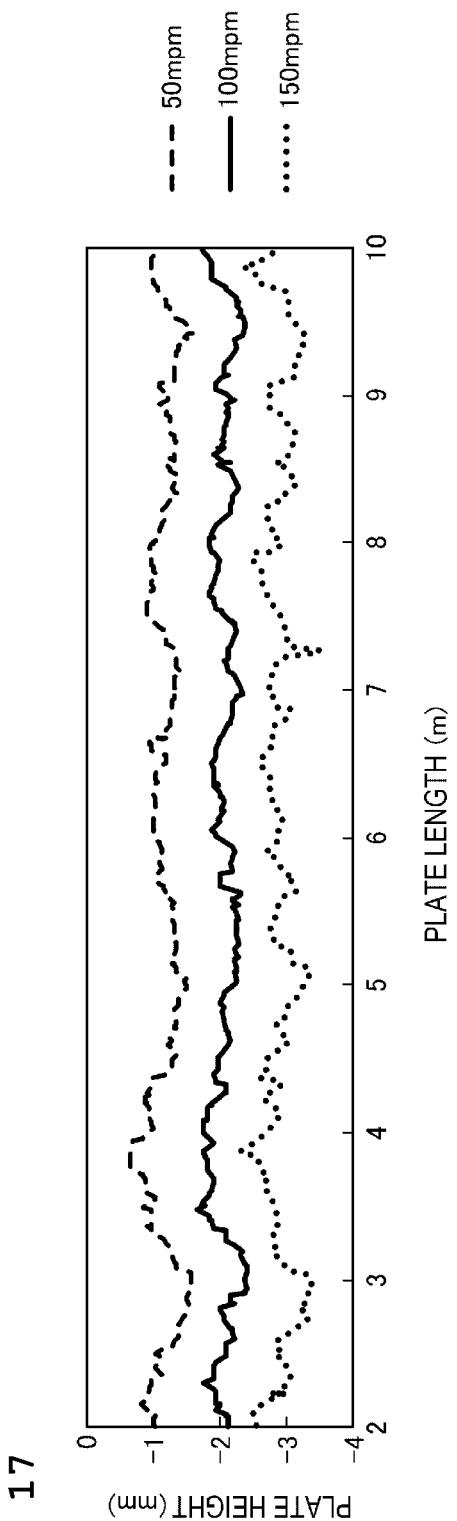
FIG. 17 is a graph showing that a measurement distance to a target surface to be measured is changed in a case where a moving velocity is different.

Next, a hardware configuration of the arithmetic processing units 11, 31, 33, 41, and 51 according to the embodiment of the invention will be described in detail, with reference to FIG. 16. FIG. 17 is a block diagram for illustrating the hardware configuration of the arithmetic processing units 11, 31, 33, 41, and 51 according to the embodiment of the invention, and collectively illustrates the arithmetic processing units 11, 31, 33, 41, and 51 as an arithmetic processing unit 200.

The arithmetic processing unit 200 mainly includes a CPU 901, a ROM 903, and a RAM 905. In addition, the arithmetic processing unit 200 further includes a bus 907, an input device 909, an output device 911, a storage device 913, a drive 915, a connection port 917, and a communication device 919.

The CPU 901 functions as a central processing device and a control device, and controls all or a part of operations in the arithmetic processing unit 200, in accordance with various programs stored in the ROM 903, the RAM 905, the storage device 913, or a removable recording medium 921. The ROM 903 stores the programs that are used by the CPU 901, calculation parameters, and the like. The RAM 905 primarily stores the programs that are used by the CPU 901, parameters that are suitably changed in the execution of the programs, and the like. The CPU 901, the ROM 903, and the RAM 905 are connected to each other by the bus 907 including an internal bus such as a CPU bus.

The bus 907 is connected to an external bus such as a peripheral component interconnect/interface (PCI) bus through a bridge.

The input device 909, for example, is a manipulation unit that is manipulated by a user, such as a mouse, a keyboard, a touch panel, a button, a switch, and a lever. In addition, the input device 909, for example, may be a remote control unit using an infrared ray or other electric waves (a so-called remote controller), or may be an external connection device 923 corresponding to the manipulation of the arithmetic processing unit 200, such as a PDA. The input device 909, for example, includes an input control circuit that generates an input signal on the basis of information input by the user with the manipulation unit described above, and outputs the information to the CPU 901, and the like. The user manipulates the input device 909, and thus, is capable of inputting various data items or instructing a processing operation, with respect to the arithmetic processing unit 200.

The output device 911 includes a device that is capable of visually or auditorily notifying the user of the acquired information. Examples of such a device include a display device such as a CRT display device, a liquid crystal display device, a plasma display device, an EL display device, and a lamp, a sound output device such as a speaker and a headphone, a printer device, a mobile phone, a fax machine, and the like. The output device 911, for example, outputs a result obtained by various processings that are performed by the arithmetic processing unit 200. Specifically, the display device displays the result obtained by various processings that are performed by the arithmetic processing unit 200, as a text or an image. On the other hand, the sound output device converts an audio signal into an analog signal from sound data, acoustic data, or the like, which is reproduced, and outputs the analog signal.

The storage device 913 is a device for storing data, which is configured as an example of a storage unit of the arithmetic processing unit 200. The storage device 913, for example, includes a magnetic storage device such as a hard disk drive (HDD), a semiconductor storage device, an optical storage device, a magnetooptical storage device, and the like. The storage device 913 stores the programs that are executed by the CPU 901, various data items, and various data items that are acquired from the outside, and the like.

The drive 915 is a reader/writer for a recording medium, and is embedded in the arithmetic processing unit 200 or is externally attached to the arithmetic processing unit 200. The drive 915 reads out information recorded in the removable recording medium 921 that is mounted, such as a magnetic disk, an optical disk, a magnetooptical disk, or a semiconductor memory, and outputs the information to the RAM 905. In addition, the drive 915 is also capable of writing recording in the removable recording medium 921 that is mounted, such as a magnetic disk, an optical disk, a magnetooptical disk, or a semiconductor memory. In addition, the removable recording medium 921, for example, is a CD medium, a DVD medium, a Blu-ray (Registered Trademark) medium, and the like. The removable recording medium 921 may be Compact Flash (CF; Registered Trademark), a flash memory, a secure digital (SD) memory card, and the like. In addition, the removable recording medium 921, for example, may be an integrated circuit (IC) card on which a non-contact IC chip is mounted, an electronic device, and the like.

The connection port 917 is a port for directly connecting a device to the arithmetic processing unit 200. Examples of the connection port 917 include a universal serial bus (USB) port, an IEEE1394 port, a small computer system interface (SCSI) port, an RS-232C port, a high-definition multimedia interface (HDMI; Registered Trademark) port, and the like. The external connection device 923 is connected to the connection port 917, and thus, the arithmetic processing unit 200 directly acquires various data items from the external connection device 923 or provides various data items to the external connection device 923.

The communication device 919, for example, is a communication interface including a communication device for connection with respect to a communication network 925, or the like. The communication device 919, for example, a communication card for a wired or wireless local area network (LAN), Bluetooth (Registered Trademark), and a wireless USB (WUSB), and the like. In addition, the communication device 919 may be a router for optical communication, a router for an asymmetric digital subscriber line (ADSL), a modem for various communications, or the like. The communication device 919, for example, is capable of receiving and transmitting a signal or the like, for example, with respect to the internet and other communication devices, in accordance with a predetermined protocol such as TCP/IP. In addition, the communication network 925 connected to the communication device 919 includes a network connected in a wired or wireless manner, or the like, and for example, may be the internet, a domestic LAN, an in-company LAN, infrared ray communication, radio wave communication, satellite communication, or the like.

As described above, an example of the hardware configuration in which the function of the arithmetic processing unit 200 according to the embodiment can be attained has been described. Each constituent described above may be configured by using a versatile member, or may be configured by hardware specialized for the functions of the constituents. Accordingly, it is possible to suitably change the hardware configuration to be used in accordance with the technical level at the time of implementing this embodiment.

(13) <Example 1>

Next, a validation test will be described. As Comparative Example, first, the distance to the plate-like target P to be measured that is moved along the direction orthogonal to the displacement measurement direction is measured by using a distance measuring apparatus of the related art in which laser light of which the frequency is modulated with respect to time is used. Here, the moving velocity V of the target P to be measured is changed to 50 mpm, 100 mpm, and 150 mpm, and each distance to the target surface S to be measured is measured by using the distance measuring apparatus of the related art, and thus, results as shown in FIG. 17 are obtained.

In the vertical axis in FIG. 17, the distance to the target surface S to be measured from a predetermined position of the distance measuring apparatus when the moving velocity V is 0 mpm is set as a reference which is as 0. As shown in FIG. 17, it is confirmed that in the distance measuring apparatus of the related art in which the laser light is used, for example, in a case where the moving velocity V is 50 mpm, a plate height is shifted from the reference by approximately 1 mm, in a case where the moving velocity V is 100 mpm, the plate height is shifted from the reference by approximately 2 mm, and in a case where the moving velocity V is 150 mpm, the plate height is shifted from the reference by approximately 3 mm.

As described above, it is confirmed that in the distance measuring apparatus of the related art in which the laser light is used, the distance to the target P to be measured (the plate height from the predetermined position), which is originally set to the same value, is detected as different values in accordance with the moving velocity V.

Next, as Example, by using the measuring apparatus of the fifth embodiment in which the relative moving velocity V of the target P to be measured and the moving direction angle α that is the information indicating the moving direction of the target P to be measured are known, the moving velocity V of the target P to be measured is set to 50 mpm, 100 mpm, and 150 mpm, and the distance to the target surface S to be measured from the predetermined position (the plate height) is measured at each of the moving velocities V as with Comparative Example described above.

Figure 18:
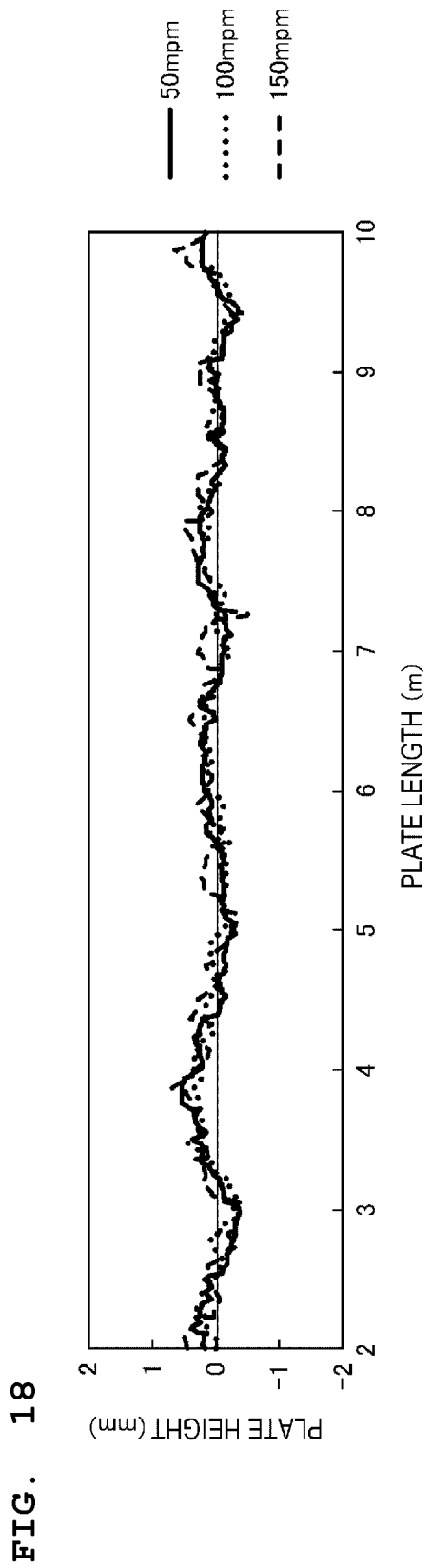
FIG. 18 is a graph showing a result at the time of calculating a distance to a target surface to be measured by using a separation displacement that is calculated.

As a result thereof, results as shown in FIG. 18 are obtained. Note that, FIG. 18 is a graph showing a result obtained by calculating the separation displacement d with the measuring apparatus of the fifth embodiment, and by calculating the distance to the target surface S to be measured from the predetermined position (the plate height) with the separation displacement d as a correction value. Note that, in this Example, one i-th measuring head $5_i$ is used, and the separation displacement d is calculated by setting the i-th optical axis angle $θ_i$ of the i-th measurement light to 2.4 degrees and the wavelength λ of the laser light to 1550 nm.

As shown in FIG. 18, it can be confirmed that even when the moving velocity V is changed to 50 mpm, 100 mpm, and 150 mpm, the measurement distances are approximately the same in the vicinity of 0 mm.

(14) <Example 2>

Figure 19:
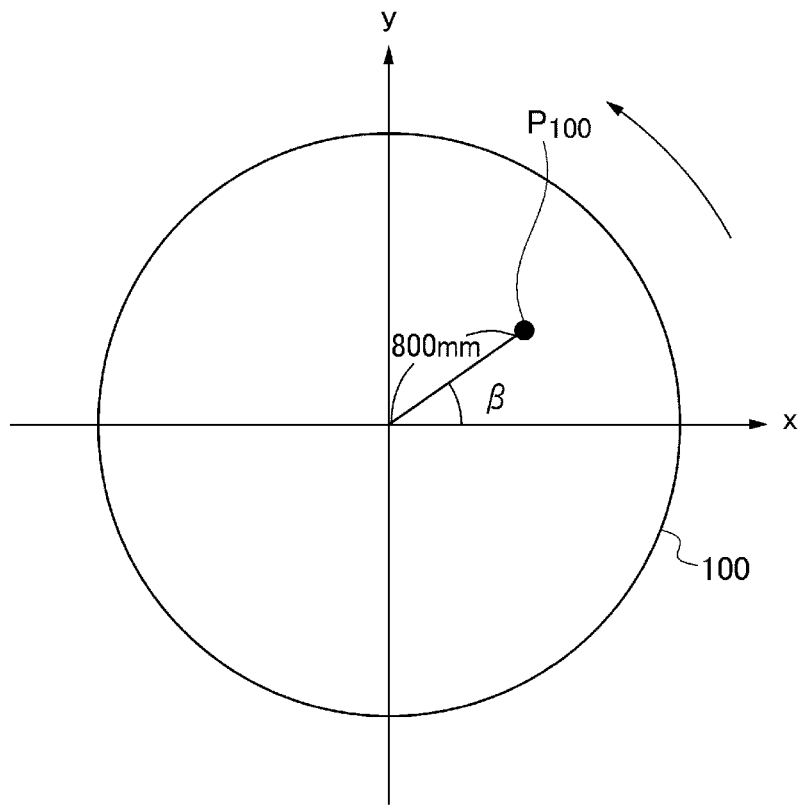
FIG. 19 is a schematic view describing an evaluation device of Example.

FIG. 19 illustrates a schematic view of an evaluation device. A moving velocity and a separation displacement in a position $P_{100}$ of 800 mm from the center (also referred to as a measurement position) are measured at an angle β° from an x axis of a disk 100 that is rotated in a counterclockwise direction (also referred to as a measurement position angle β°), by setting a position in which the measuring head and the surface of the disk are separated by approximately 300 mm, as a reference position, with the measuring apparatus of the first embodiment of the invention in which three measuring heads are provided (Optical Axis Angle $θ_i$: $θ_1=θ_2=θ_3=5°$, Projection Angle $Φ_i$: $Φ_1=0°$, $Φ_2=120°$, $Φ_3=240°$, and Wavelength λ of Laser=1550 nm). Note that, the moving direction angle α and the measurement position angle β have a relationship of α=β+90°.

Figure 20:
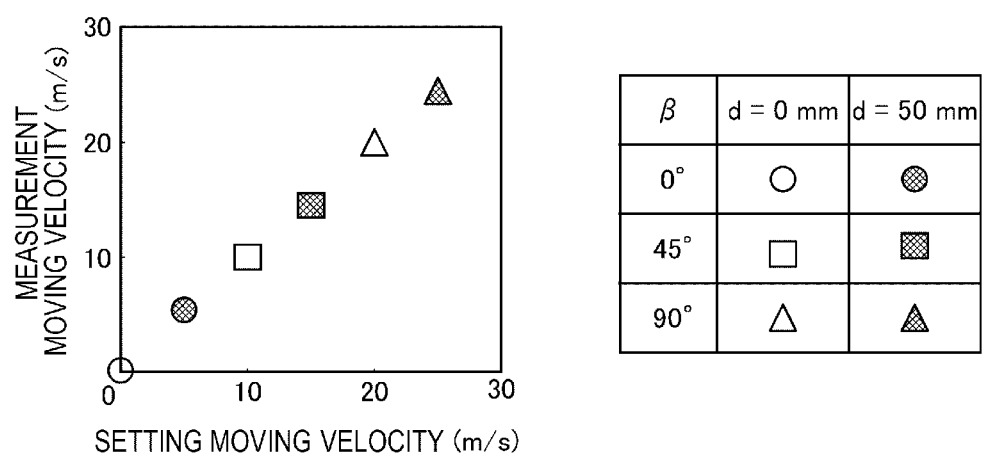
FIG. 20 is a graph showing measurement results of a separation displacement and a moving velocity when a moving direction is displaced.

FIG. 20 shows a comparison between a setting value of the moving velocity V (also referred to as a setting moving velocity) and a measurement value (also referred to as a measurement moving velocity), by setting the separation displacement d to 0 mm (a reference position) and 50 mm, and by rotating the disk 100 at a setting moving direction angle β° of 0°, 45°, and 90°. It is confirmed that the moving velocity can be accurately measured regardless of different separation displacements and different moving direction angles.

Figure 21:
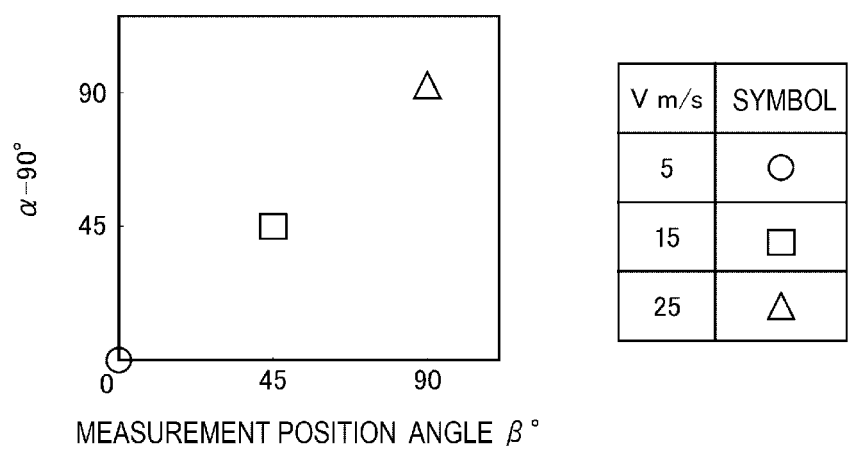
FIG. 21 is a graph showing a measurement result of a moving direction.

FIG. 21 shows measurement value−90° of moving direction angle α (in FIG. 21, "α−90°" is notated on a vertical axis) that is obtained by changing the measurement position angle β° to 0°, 45°, and 90° in the reference position, in a condition of a setting moving velocity of 5 m/s, 15 m/s, and 25 m/s. Accordingly, it is confirmed that the moving direction angle α can be accurately measured regardless of the moving velocity and the moving direction angle. Accordingly, it is confirmed that the moving direction of the measurement position can be accurately measured.

REFERENCE SIGNS LIST

1 Measuring apparatus
2 Laser oscillator
$5_i$ i-th measuring head (measuring head)
$7_i$ i-th light detection unit
11, 31, 33, 41, 51, 200 Arithmetic processing unit
d Separation displacement
P, P1 Target to be measured
ΔR Separation displacement
S Target surface to be measured, curved surface
$θ_1$ i-th optical axis angle (optical axis angle, inclination angle)
$Φ_i$ i-th projection angle (projection angle, inclination angle)

The invention claimed is:

1. A measuring apparatus for measuring at least any one of a separation displacement that is a displacement of a target to be measured that is moved in a predetermined direction and a moving velocity that is a relative velocity in a direction orthogonal to the predetermined direction, the apparatus comprising:
an optical splitter splitting laser light that is modulated with respect to time by a predetermined frequency modulation velocity into reference light and measurement light;
one or two or more measuring heads including an irradiation and light receiving surface that irradiates the measurement light and receives reflection light obtained by reflection of the measurement light, wherein the measuring apparatus includes i number of measuring heads, i being an integer greater than or equal to 1;
a light detection unit outputting a beat signal by light interference between e reflection light and the reference light; and
an arithmetic processing unit to which the beat signal is input,
wherein in the measuring head, an optical axis of the laser light that is irradiated from the irradiation and light receiving surface is disposed to be inclined with respect to the predetermined direction, and the arithmetic processing unit detects a beat frequency based on the beat signal, calculates a frequency difference that is a difference between the beat frequency at the time of measurement and a reference frequency that is a beat frequency in a predetermined reference state, and calculates at least any one of the moving velocity and the separation displacement, on the basis of a relationship of a following expression:

$$\Delta f_i = k(d/\cos\theta_i) + ((2V\cos\alpha\cos\Phi_i\sin\theta_i)/\lambda) + ((2V\sin\alpha\sin\Phi_i\sin\theta_i)/\lambda)$$

where $\Delta f_i$ is the frequency difference, d is the separation displacement, V is the moving velocity, $\theta$ is an optical axis angle being an angle of the optical axis relative to a normal direction of the target surface to be measured, $\Phi$ is a projection angle, $\lambda$ is a wavelength of the laser, k is a constant number, and $\alpha$ is a moving direction angle of the target to be measured.

2. The measuring apparatus according to claim 1, wherein the arithmetic processing unit includes a moving direction acquisition unit acquiring information from the outside, the information indicating a moving direction of the target to be measured that is moved in the direction orthogonal to the predetermined direction, and calculates at least any one of the moving velocity and the separation displacement on the basis of the information indicating the moving direction that is acquired by the moving direction acquisition unit.

3. The measuring apparatus according to claim 1, wherein the arithmetic processing unit includes a velocity acquisition unit acquiring the moving velocity, and calculates the separation displacement on the basis of the moving velocity that is acquired by the velocity acquisition unit.

4. The measuring apparatus according to claim 1, wherein the arithmetic processing unit includes a separation displacement acquisition unit acquiring the separation displacement, and calculates the moving velocity on the basis of the separation displacement that is acquired by the separation displacement acquisition unit.

5. The measuring apparatus according to claim 1, wherein the arithmetic processing unit includes a calibration data acquisition unit acquiring a velocity difference that is measured by changing the moving velocity of the target to be measured, as a calibration velocity difference, acquires a difference in the beat frequency at the time of changing the moving velocity of the target to be measured in order to acquire the calibration velocity difference, as a calibration frequency difference, and calculates the inclination angle of the optical axis of the laser light by using a wavelength of the laser light, the calibration velocity difference, and the calibration frequency difference.

6. The measuring apparatus according to claim 1, wherein a number of laser light being irradiated on the target surface to be measured is the same as a number of measuring heads.

7. The measuring apparatus according to claim 1, wherein the measuring apparatus measures the separation displacement that is the displacement of a target to be measured that is moved in the predetermined direction and the moving velocity that is the relative velocity in the direction orthogonal to the predetermined direction, and wherein the arithmetic processing unit calculates the moving velocity and the separation displacement, on the basis of the frequency difference and an inclination angle of the optical axis of the laser light that is disposed to be inclined.

8. The measuring apparatus according to claim 7, wherein a number of measuring heads is two or more.

9. The measuring apparatus according to claim 1, wherein the predetermined direction is the normal direction of the target surface to be measured, wherein the measuring apparatus measures the separation displacement that is the displacement of the target to be measured that is moved in the normal direction of a target surface to be measured, and wherein the arithmetic processing unit calculates the separation displacement, on the basis of the frequency difference and the inclination angle of the optical axis of the laser light that is disposed to be inclined.

10. The measuring apparatus according to claim 1, wherein the predetermined direction is the normal direction of the target surface to be measured, wherein the number of the measuring head is one, wherein the number of the laser light being irradiated on the target surface to be measured is one, and either condition i) or condition ii) is fulfilled:

condition i): the arithmetic processing unit includes a velocity acquisition unit acquiring the moving velocity, and calculates the separation displacement on the basis of the moving velocity that is acquired by the velocity acquisition unit; and condition ii): the arithmetic processing unit includes a separation displacement acquisition unit acquiring the separation displacement, and calculates the moving velocity on the basis of the separation displacement that is acquired by the separation displacement acquisition unit.

11. A measuring method for measuring at least any one of a separation displacement that is a displacement of a target to be measured that is moved in a predetermined direction and a moving velocity that is a relative velocity in a direction orthogonal to the predetermined direction, the method comprising:

a splitting step of splitting laser light that is modulated with respect to time y a predetermined frequency modulation velocity into reference light and measurement light;

an irradiation and light receiving step of irradiating a surface of the target to be measured with the measurement light from an irradiation and light receiving surface and of receiving reflection light obtained by the measurement light that is reflected on the surface of the target to be measured with the irradiation and light receiving surface, by using one or two or more measuring heads in which an optical axis of the laser light that is irradiated from the irradiation and light receiving surface is disposed to be inclined with respect to the predetermined direction, wherein a number of measuring heads is i, i being an integer greater than or equal to 1;

a light detecting step of outputting a beat signal by light interference between the reflection light and the reference light; and an arithmetic processing step of performing arithmetic processing with an arithmetic processing unit by inputting the beat signal into the arithmetic processing unit, wherein in the arithmetic processing step, a beat frequency based on the beat signal is detected, a frequency difference that is a difference between the beat frequency at the time of measurement and a reference frequency that is a beat frequency in a predetermined reference state is calculated, and at least any one of the moving velocity and the separation displacement is calculated on the basis of a relationship of the following expression:

$$\Delta f_i = k(d/\cos\theta_i) + ((2V\cos\alpha\cos\Phi_i\sin\theta_i)/\lambda) + ((2V\sin\alpha\sin\Phi_i\sin\theta_i)/\lambda)$$

where $\Delta f_i$ is the frequency difference, d is the separation displacement, V is the moving velocity, θ is an optical axis angle being an angle of the optical axis relative to a normal direction of the target surface to be measured, Φ is a projection angle, λ is a wavelength of the laser, k is a constant number, and α is a moving direction angle of the target to be measured.

12. The measuring method according to claim 11, wherein in the arithmetic processing step, a moving direction acquiring step of acquiring information from the outside, the information indicating a moving direction of the target to be measured is provided, and at least any one of the moving velocity and the separation displacement is calculated on the basis of the information indicating the moving direction that is acquired in the moving direction acquiring step.

13. The measuring method according to claim 11, wherein in the arithmetic processing step, a velocity acquiring step of acquiring the moving velocity is provided, and the separation displacement is calculated on the basis of the moving velocity that is acquired in the velocity acquiring step.

14. The measuring method according to claim 11, wherein in the arithmetic processing step, a separation displacement acquiring step of acquiring the separation displacement is provided, and the moving velocity is calculated on the basis of the separation displacement that is acquired in the separation displacement acquiring step.

15. The measuring method according to claim 11, wherein a number of laser light being irradiated on the target surface to be measured is the same as a number of measuring heads.

16. The measuring method according to claim 11, wherein the separation displacement that is the displacement of a target to be measured that is moved in the predetermined direction and the moving velocity that is the relative velocity in the direction orthogonal to the predetermined direction is measured, and wherein, in the arithmetic processing step, the moving velocity and the separation displacement is calculated on the basis of the frequency difference and an inclination angle of the optical axis of the laser light that is disposed to be inclined.

17. The measuring method according to claim 16, wherein a number of measuring heads is two or more.

18. The measuring method according to claim 11, wherein the predetermined direction is the normal direction of the target surface to be measured, wherein the separation displacement that is the displacement of the target to be measured that is moved in the normal direction of a target surface to be measured is measured, and wherein, in the arithmetic processing step, the separation displacement is calculated on the basis of the frequency difference and the inclination angle of the optical axis of the laser light that is disposed to be inclined.

19. The measuring method according to claim 11, wherein the predetermined direction is the normal direction of the target surface to be measured, wherein the number of the measuring head is one, wherein the number of the laser light being irradiated on the target surface to be measured is one, and either condition i) or condition ii) is fulfilled:

condition i): the arithmetic processing unit includes a velocity acquisition unit acquiring the moving velocity, and calculates the separation displacement on the basis of the moving velocity that is acquired by the velocity acquisition unit; and condition ii): the arithmetic processing unit includes a separation displacement acquisition unit acquiring the separation displacement, and calculates the moving velocity on the basis of the separation displacement that is acquired by the separation displacement acquisition unit.

20. A measuring method for measuring an inclination angle of an optical axis of laser light, that is applied toward a target to be measured that is moved, the method comprising:

a splitting step of splitting the laser light that is modulated with respect to time by a predetermined frequency modulation velocity into reference light and measurement light;

an irradiation and light receiving step of irradiating a surface of the target to be measured with the measurement light from an irradiation and light receiving surface and of receiving reflection light obtained by the measurement light that is reflected on the surface of the target to be measured with the irradiation and light receiving surface, by using one or two or more measuring heads in which the optical axis of the laser light that is irradiated from the irradiation and light receiving surface is disposed to be inclined with respect to a predetermined direction of the target to be measured that is moved;

a light detecting step of outputting a beat signal by light interference between the reflection light and the reference light; and an arithmetic processing step of performing arithmetic processing with an arithmetic processing unit by inputting the beat signal into the arithmetic processing unit, wherein in the arithmetic processing step, a calibration data acquiring step of acquiring a velocity difference that is measured by changing a moving velocity of the target to be measured, as a calibration velocity difference, is provided, a difference in a beat frequency based on the beat signal at the time of changing the moving velocity of the target to be measured in order to acquire the calibration velocity difference is acquired as a calibration frequency difference, and the inclination angle of the optical axis of the laser light is calculated by using a wavelength of the laser light, the calibration velocity difference, and the calibration frequency difference.

* * * * *